June 9, 1964 — E. R. HOYT — 3,136,231
SPIRAL TUBE MAKING MACHINE
Filed May 12, 1960 — 8 Sheets-Sheet 2
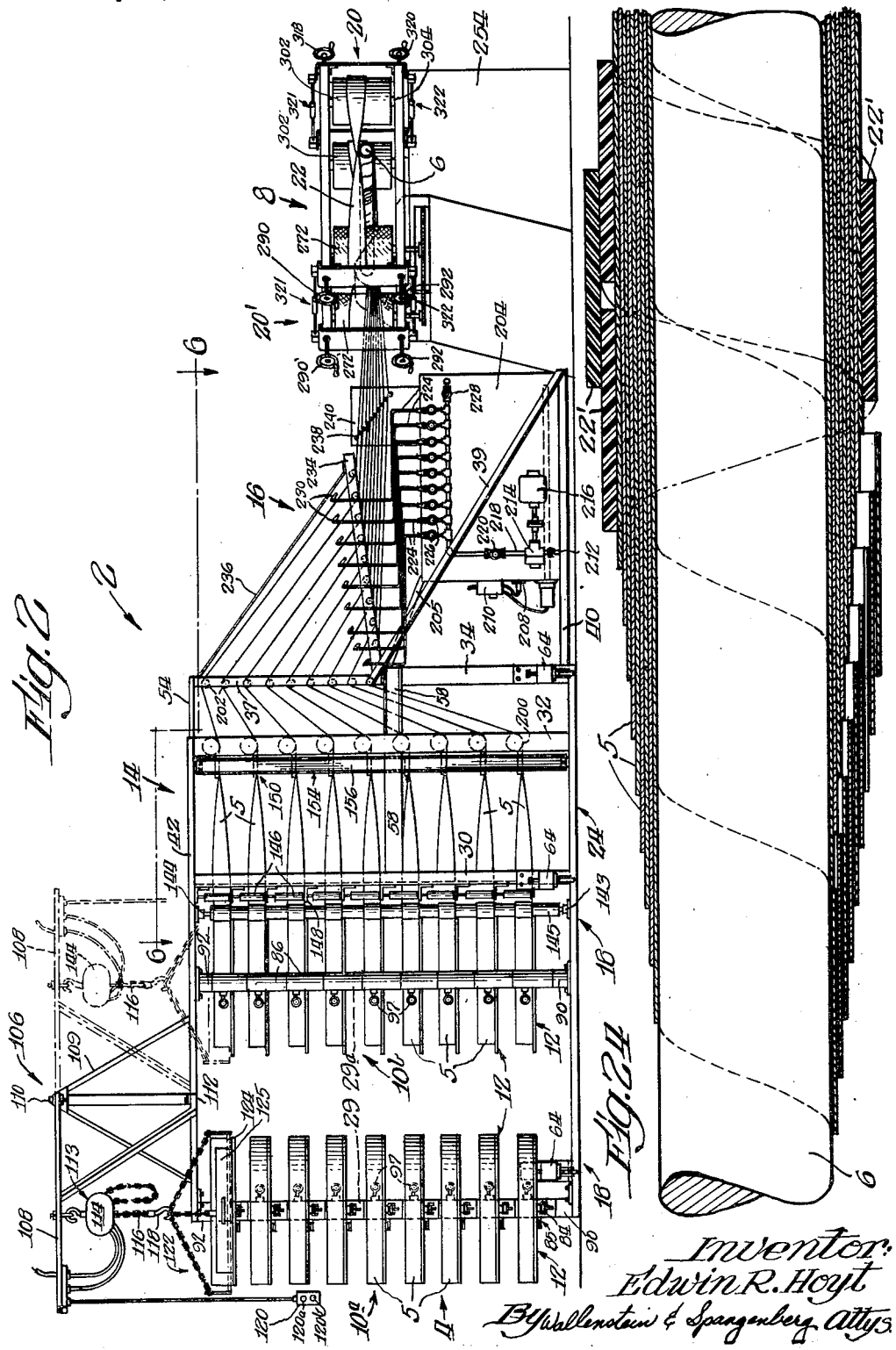
Inventor:
Edwin R. Hoyt
By Wallenstein & Spangenberg, Attys.

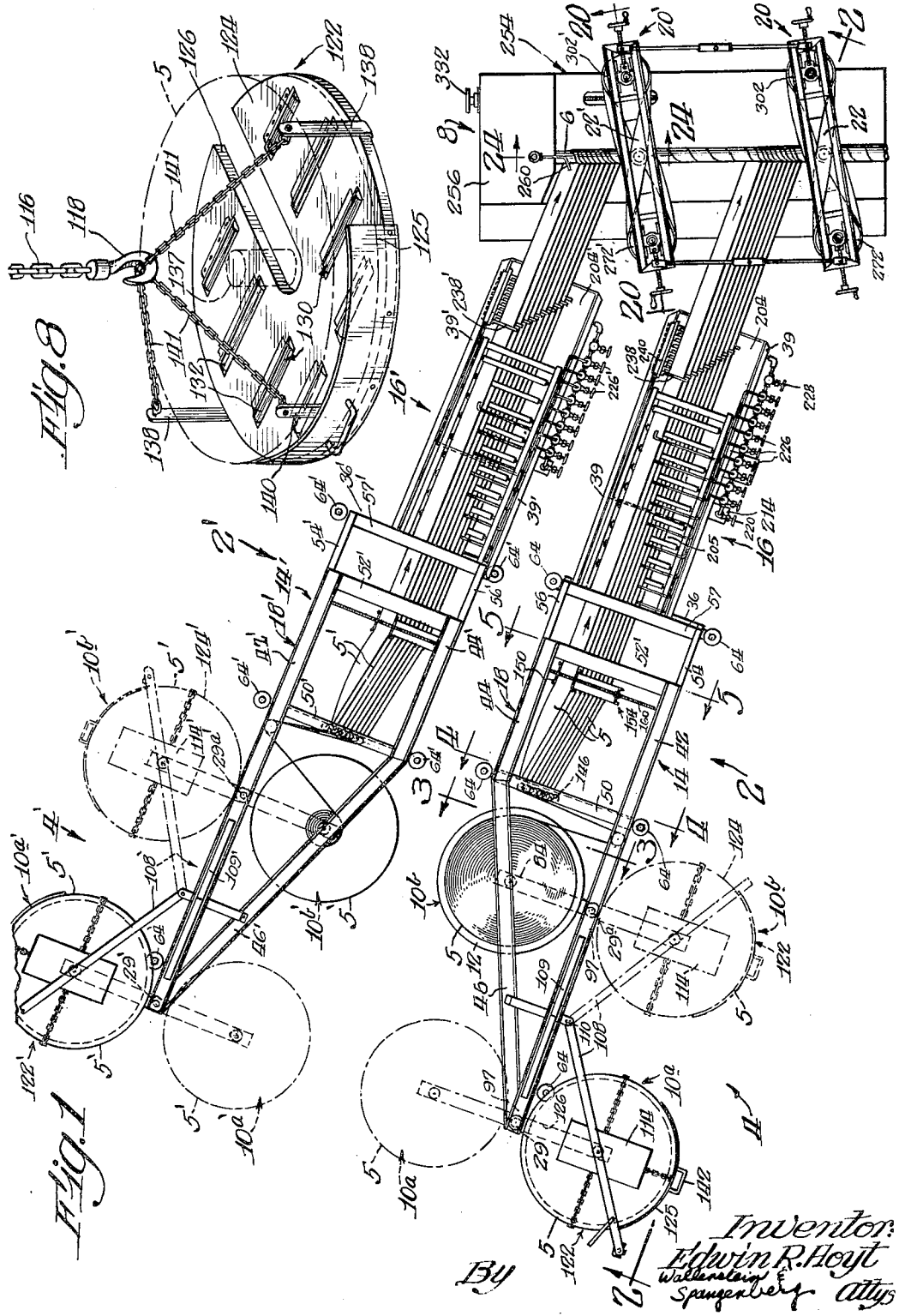

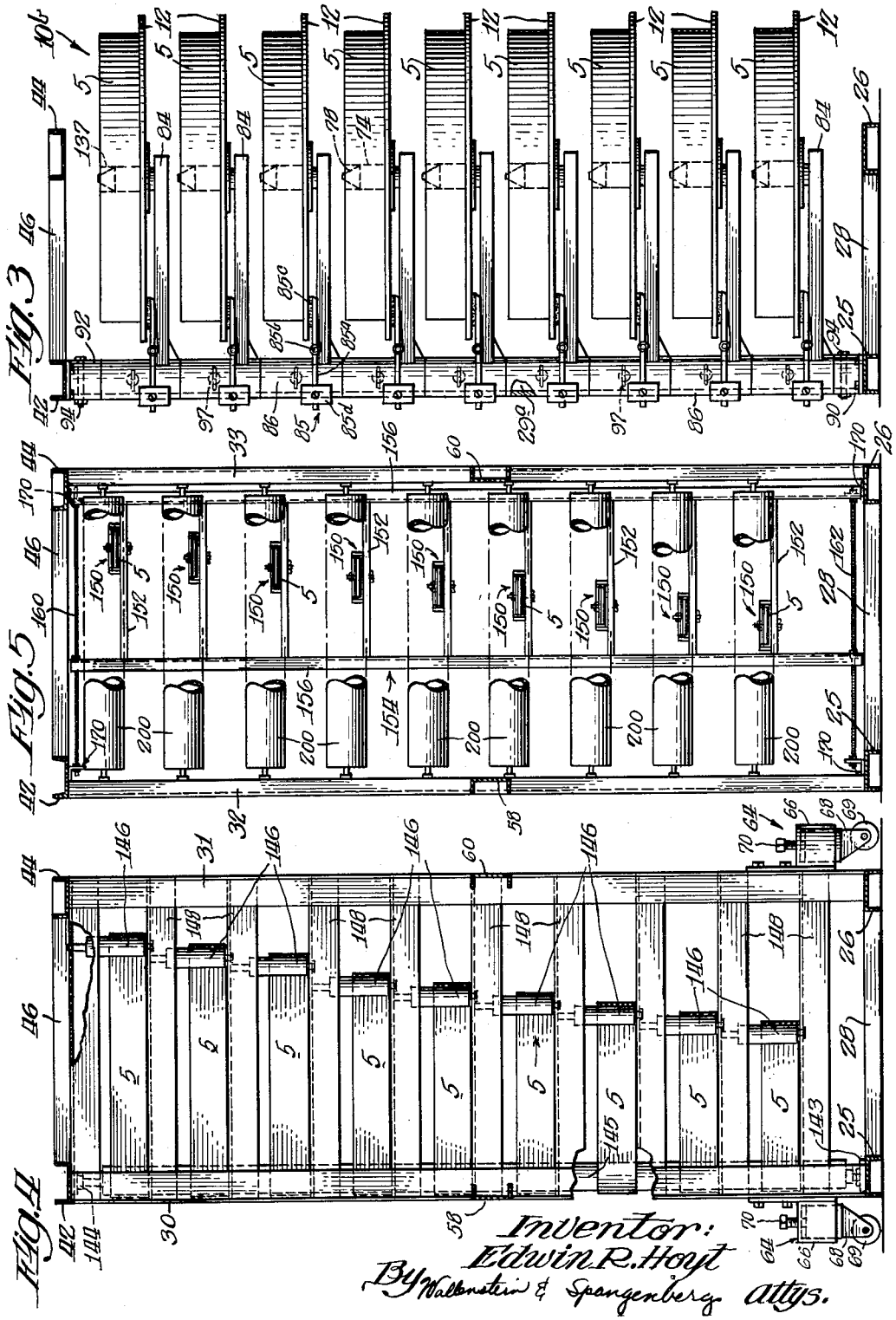

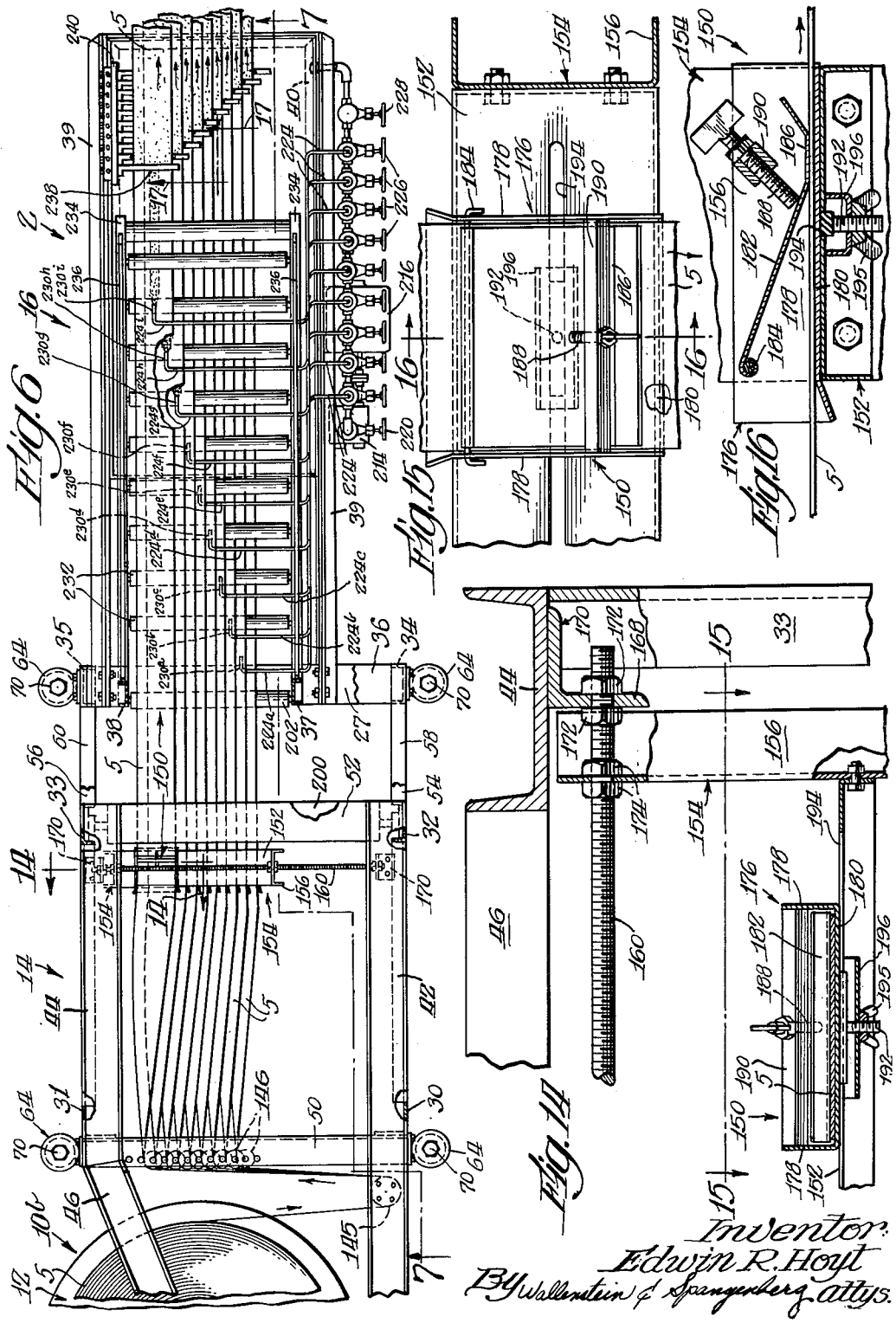

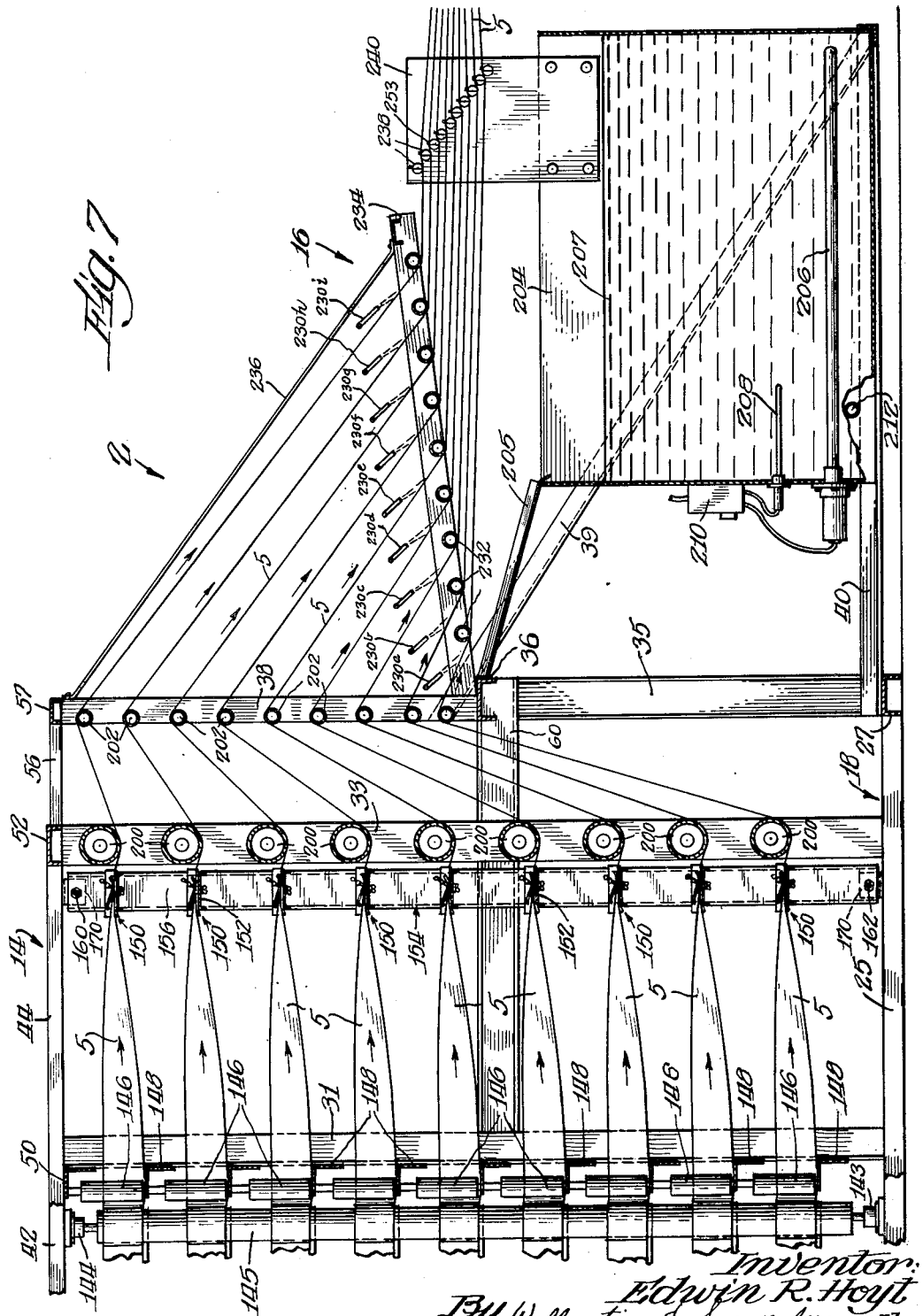

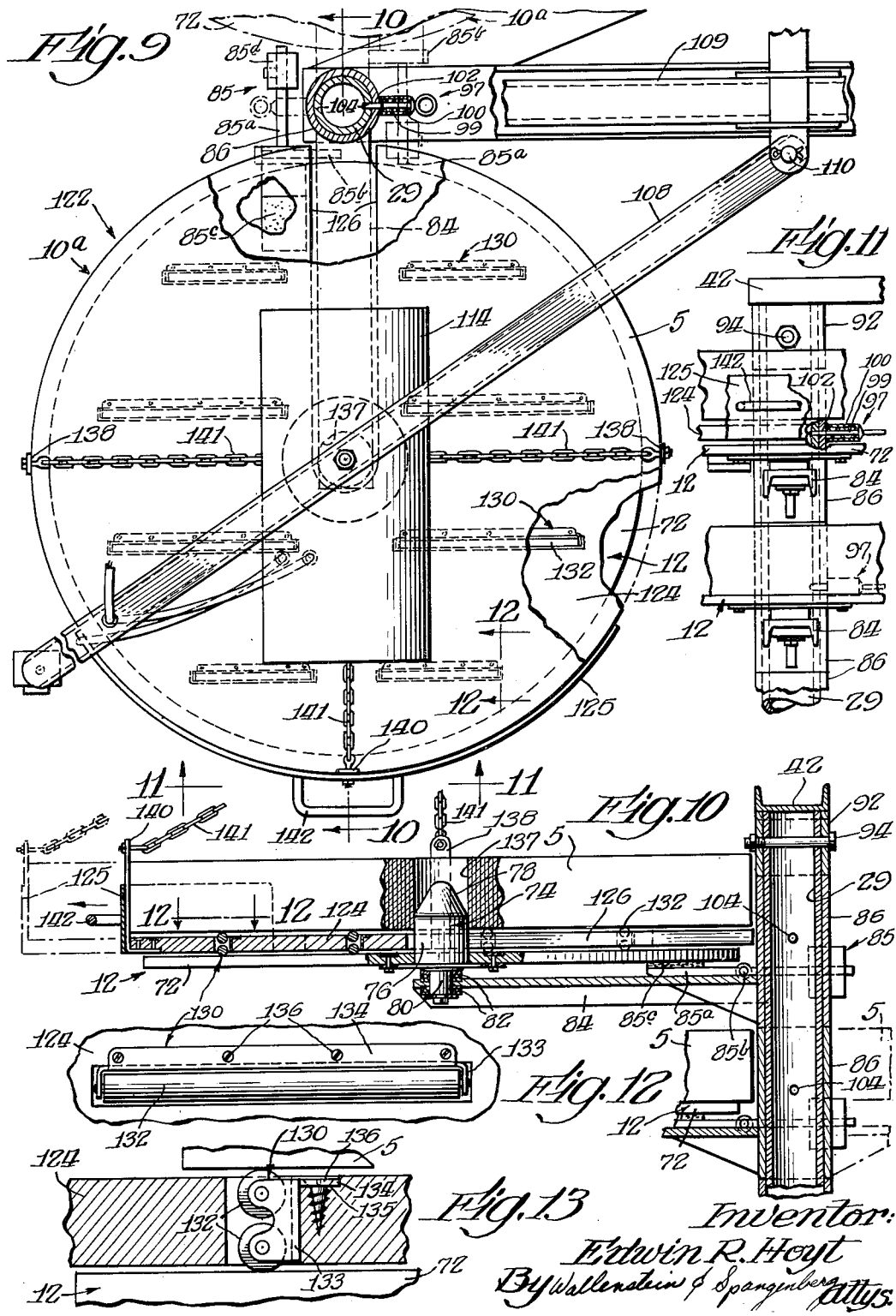

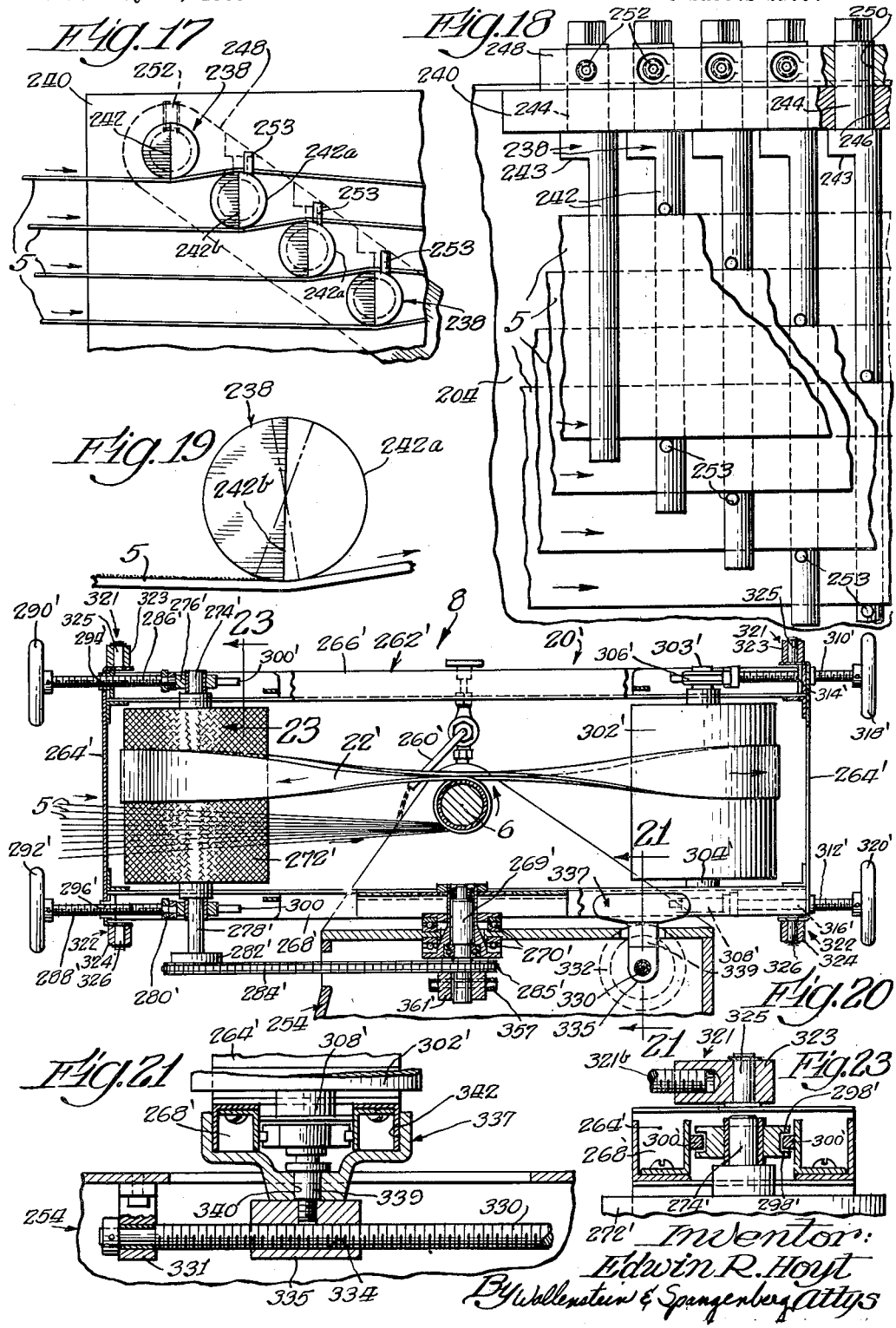

June 9, 1964  E. R. HOYT  3,136,231
SPIRAL TUBE MAKING MACHINE
Filed May 12, 1960  8 Sheets-Sheet 8

Inventor:
Edwin R. Hoyt
By Wallenstein & Spangenberg Attys.

3,136,231
SPIRAL TUBE MAKING MACHINE
Edwin R. Hoyt, Pebble Beach, Calif., assignor to U.S. Paper Mills Corp., Chicago, Ill., a corporation of Wisconsin
Filed May 12, 1960, Ser. No. 28,634
31 Claims. (Cl. 93—80)

This invention relates to spiral tube making machines (although some aspects thereof have a more general application). More particularly, the invention relates to the improvement in the means for supporting and guiding strips of flexible material in a precise overlapped relation to a horizontal mandrel and applying an even coating of adhesive on one side of the strips, and also to apparatus for supporting and driving a belt which winds the strips of flexible material around the mandrel to form the spiral tubes.

For many years spiral tubes have been made by wrapping overlapping strips of adhesive-coated paper around a slightly tapered horizontal mandrel by means of an endless belt wrapped around the mandrel. A continuous spiral tube is formed which moves toward the smaller end of the mandrel. Relatively short tubes of any desired length are formed by cutting off sections of the tube as it comes off the mandrel. The strips of flexible material fed to the mandrel extend from relatively large rolls which may be as much as three feet or more in diameter. The rolls have generally been supported for rotation about horizontal axes in vertically and horizontally staggered relation, so that the strips leave the rolls in a horizontal plane and in an overlapped relation. This arrangement, however, is disadvantageous from at least two main standpoints. In the first place, the staggering of the large rolls results in large floor space requirements since large numbers of plies are used in making the tubes. For example, it is not uncommon to use as many as from 9 to 18 plies in making a single tube. In the second place, the arrangement just described results in long runs betwen the supply rolls and the mandrel with the resulting difficulty in preventing wobbling of the strips and otherwise stabilizing the same so that they can be fed in a precise overlapped relation to the mandrel and thereby result in high quality tubes. Because of these and other difficulties encountered in feeding the strips of material in precise overlapped relation to the mandrel, the spiral tube making machines heretofore made often produce defective tubes and are relatively slow operating.

Additionally, due to the nature of their design, these machines are not readily adjustable in use. It is often difficult to adjust precisely many of the variable instrumentalities of the spiral tube making machines before the machine is set into operation, and the spiral tube made thereby must be examined during the fabrication process to see if the adjustments are proper. It is frequently necessary to stop the machines several times to make many of the necessary adjustments, which makes proper set-up of the machine difficult and time consuming.

Still other difficulties encountered with these machines is in applying an even layer of liquid adhesive of the proper thickness to the adhesive strips prior to their application to the mandrel. Obviously, an insufficient amount of adhesive will result in a weak or otherwise improperly fabricated tube, and an excessive amount of adhesive frequently results in slippage between the layers of the tube before the adhesive dries, requires a long time for drying, and often results in undesired accumulation of adhesive on various parts of the machinery over which the strips pass. Also, the apparatus used to apply the adhesive to the strips is generally bulky, costly and burdensome to maintain.

It is, accordingly, an object of the invention to overcome the aforesaid and other disadvantages present in the spiral tube making machines heretofore made. More specifically, one of the objects of the present invention is to provide a spiral tube making machine which occupies substantially less floor space than machines of a comparable capacity heretofore made, and, further, wherein the distances between the points of support of the strips of flexible material unwinding from the rolls are relatively short where wobbling of the strips is at a minimum, so that the strips may be readily accurately positioned in a precise predetermined overlapped relation.

Another object of the invention is to provide a unique arrangement of supply reels which enables ready loading of fresh rolls of material into the machine without stopping the machine.

Still another object of the invention is to provide a spiral tube making machine which is extremely flexible in that it can be used to make tubes of widely varying sizes. A related object of the invention is to provide a spiral tube making machine wherein most of the adjustments of the variable machine may be made while the machine is in operation, so that the adjustments can be made while observing the tube being produced by the machine.

Another object of the present invention is to provide improved adhesive-applying means by means of which very thin layers of liquid adhesive may be readily evenly applied across the entire widths of the strips of material. A related object of the invention is to provide adhesive-applying means which can be used with strips of practically any width, and wherein the adhesive-applying means is relatively compact, has a low initial cost, and is self-cleaning. Another related object of the invention is to provide adhesive-applying apparatus which requires little operator attention, and is usable with both slow and fast operating speeds, with only minor adjustments being required.

A still further object of the invention is to provide a spiral tube making machine which will operate at substantially higher speeds than was heretofore practical with spiral tube making machines heretofore made, and which further makes a spiral tube of exceedingly high quality using relatively low cost materials.

Still another object of the present invention is to provide improved apparatus for supporting the belt which winds the strips of material around the mandrel, wherein the belt supporting means has various adjustments which adapt the machine for use in the fabrication of tubes of widely varying sizes. A related object of the present invention is to provide belt support means as just described wherein the angle between the belt and the mandrel may be varied and various other adjustments made while the machine is running and active in fabricating a tube.

Still another object of the present invention is to provide a pair of belt-support frames mounted in longitudinally spaced relation along the mandrel, so that two belts are provided for winding two different sections of overlapped strips of material around the mandrel at the same time, and, further, wherein means are provided for adjustably, yet rigidly, interconnceting the two belt support frames in a manner which permits simultaneous adjustment of the angles of the two frames while the machine is in operation and active in fabricating a tube.

In accordance with one aspect of the present invention, it has been found that the compactness of the machine and the ability to locate the strips in precise overlapped relation are greatly facilitated by arranging the rolls of the strips of flexible material in a vertical stack where the rolls are mounted for rotation about a vertical axis coextensive with the longitudinal roll axis, so as to present strips of flexible material in a generally vertical plane. The space occupied by the stack, therefore, is no more than the space required for a single roll. Guide means are provided around which the strips of flexible material leaving the rolls extend and which brace the same for a 90° twist which brings the planes of the strips of the flexible material into a position where the side edges thereof face horizontally. Since the rolls of material are initially in vertically spaced and adjacent relation, the strips after being twisted are readily placeable in vertically spaced and overlapped relation.

The stacking of the rolls of material also enables the run of all of the strips to be of the same general small order relative to the runs previously required with the aforesaid staggered arrangement of the rolls supported for rotation about staggered horizontal axes.

The rolls of flexible strip material are preferably supported upon supply reels carried on the ends of separately swingable reel carrier arms. The arms more most advantageously movable in a horizontal plane between strip feeding and roll supplying positions which are 180° apart. A spare stack of rolls is provided by mounting a second stack of supply reels next to the aforementioned stack and so that the strip feeding and roll supplying positions of the reel carrier arms of both stacks extend transversely of the spacing between the two stacks. With this arrangement, it is a simple matter to mount a new roll of flexible material upon any supply reel in any stack. The arrangement also makes it convenient to adhesively or otherwise secure the leading edge of a given roll of flexible strip material to an end portion of a roll which is just about exhausted without shutting down the machine.

After the twisted strips have been positioned in spaced overlappeed relation, they preferably pass around individual vertically spaced guide rollers to orient the strips in a generally downwardly and forwardly extending direction. A liquid adhesive is then applied to the strips by individual adhesive applying means in the form of depending adhesive applicator tubes positioned between the adjacent strips of overlapped material. The adhesive applicator tubes each drop a narrow line of adhesive material upon the associated advancing strip. The adhesive material is pumped through various individual pipes having individual control valves for adjusting the quantity of adhesive dropping from the individual adhesive applicator tubes. This arrangement is not only compact and economical, but is self-cleaning, flexible in that it is usable with strips of practically any width and moving at any speed, and requires a minimum of operator attention.

Adhesive spreading and scraping means are positioned forwardly of the adhesive applicator tubes so as to spread the lines of adhesive over the various strips and also to wipe away excessive adhesive. The adhesive spreading and scraping means associated with a given strip of material is located behind the spreading and scraping means of the strip therebelow, so that the excessive adhesive dripping down from the upper strip upon the lower strip is thereby wiped away by the lower spreading and scraping means. The adhesive applying tubes and the adhesive spreading and scraping means are located above an open-top adhesive supply, a tank or a drip pan leading to the tank containing the adhesive material involved.

The aforementioned supply reels and reel carrier arms, the various guide means through which the strips extend, and the adhesive applying, spreading and scraping means are all supported on a common frame which can be readily adjusted to extend at any angle. As previously indicated, this angle depends upon many factors including the particular diameter of the tube being manufactured.

For very thick tubes, it is desirable to feed two groups of overlapped strips to the mandrel at longitudinally spaced points therealong. In such case, two separate frame units carrying the various instrumentalities described above are provided with the instrumentalities in one frame arranged in inverted relation to those of the other unit, so that the two frame units and their instrumentalities appear as mirror images of one another. The angles of these frame units are individually adjustable with respect to the mandrel, which is important since the portions of the tube thickness occupied by the strips applied by the frame unit are different, and the optimum angles of feed are accordingly different.

In the latter case where two different groups of strips of overlapped material are provided, separate belt-carrying units are provided for supporting individual belts which wrap the two groups of flexible material around the mandrel. Each of these units comprises a frame through which the mandrel extends. A belt-driving drum is supported at one end of the frame between upper and lower sections of the frame and a belt-receiving drum is supported at the other end of the frame on the other side of the mandrel between the upper and lower frame sections. Each of the drums is most advantageously supported for rotation about a generally vertical axis which is somewhat adjustable so as adjustably to tilt the angle of the drum axis and also to vary the spacing of the drum from the mandrel to adjust the tension in the belt. These adjustments can be conveniently made while the machine is in operation. The adjustment of the tilt angle of the drum axes is particularly important where the machine is used to make tubes of varying diameters.

The two drum-supporting frames are preferably connected together by adjustable length tie rod assemblies extending respectively between the aforesaid upper and lower sections of the frames. Stresses created upon the frames when making heavy walled tubes at high speeds requires firm bracing at the upper and lower sections of the frame if the belts are to be driven at precise angular relationships. The adjustable length of the tie rod assemblies enables the belt-carrying units to be operated at a slightly different angle which, as above indicated, is often highly desirable.

Each drum-supporting frame is mounted for rotation about a central vertical axis passing through the mandrel. Drum-driving means are provided which include motion transmitting gears or the like which are mounted for rotation about the latter axis and a belt or chain or the like which transmits the motion thereof to the end of the belt-driving drum involved. Means are provided for adjusting the angular position of the frames, which means may include a screw shaft passing through a nut secured to one of the aforesaid frames, and coupling means secured to the nut which permits both pivotal as well as linear movement between the frame and the nut. The angular position of the frames can thus be varied simultaneously while the machine is being operated, since the spacing between the motion transmitting and motion receiving points of the transmission do not vary with the angular position of the frames.

Other objects, advantages and features of the invention will become apparent upon making reference to the specification to follow, the claims and the drawings wherein:

FIG. 1 is a plan view of a preferred form of the tube making machine of the present invention;

FIG. 2 is a side elevational view of the machine shown in FIG. 1, taken along viewing plane 2—2 therein;

FIG. 3 is an enlarged transverse sectional view through the machine of FIG. 1, taken along section line 3—3 therein;

FIG. 4 is an enlarged transverse sectional view through the machine of FIG. 1, taken along section line 4—4 therein;

FIG. 5 is an enlarged transverse sectional view through the machine shown in FIG. 1, taken along section line 5—5 therein;

FIG. 6 is an enlarged sectional view of a portion of the machine shown in FIG. 2, taken along section line 6—6 therein;

FIG. 7 is an enlarged vertical sectional view of the portion of the machine shown in FIG. 6, taken along section line 7—7 therein;

FIG. 8 is a perspective view of a roll carrier unit used to carry and position a roll upon one of the supply reels of the machine;

FIG. 9 is a greatly enlarged plan view of the machine, partly broken away and partly in section, as the roll carrier unit shown in FIG. 8 is lowered into position upon one of the supply reels.

FIG. 10 is a vertical sectional view through FIG. 9, taken along section line 10—10 therein;

FIG. 11 is a fragmentary side elevational view of a portion of the machine shown in FIG. 9, partly broken away, as seen along viewing plane 11—11 therein;

FIG. 12 is an enlarged fragmentary plan view of a portion of the machine shown in FIG. 10, as seen along viewing plane 12—12 therein;

FIG. 13 is a greatly enlarged fragmentary vertical sectional view through a portion of the machine shown in FIG. 9, taken along section line 13—13 therein;

FIG. 14 is a greatly enlarged, fragmentary, sectional view through a portion of the machine shown in FIG. 6, taken along section line 14—14 therein;

FIG. 15 is a horizontal sectional view through FIG. 14, taken along section line 15—15 therein;

FIG. 16 is a vertical sectional view through FIG. 15, taken along section line 16—16 therein;

FIG. 17 is an enlarged fragmentary vertical sectional view through the adhesive spreading and scraping means as seen along viewing plane 17—17 in FIG. 6;

FIG. 18 is a plan view, partially in section, of the adhesive spreading and scraping means shown in FIG. 17;

FIG. 19 is an enlarged end view of one of the adhesive spreading and scraping means showing in solid and dashed lines various alternate positions thereof for adjusting the thickness of the adhesive material remaining on the strip of material suggested thereby;

FIG. 20 is an enlarged vertical sectional view through the belt-carrying portion of the machine, taken along section line 20—20 in FIG. 1;

FIG. 21 is a greatly enlarged vertical fragmentary sectional view through a portion of the machine shown in FIG. 20, taken along section line 21—21 therein;

FIG. 23 is an enlarged fragmentary sectional view of a portion of the machine shown in FIG. 20, taken along section line 23—23 therein; and FIG. 24 is an enlarged longitudinal sectional view through the mandrel of the machine, taken along section line 24—24 of FIG. 1.

Figure 22:
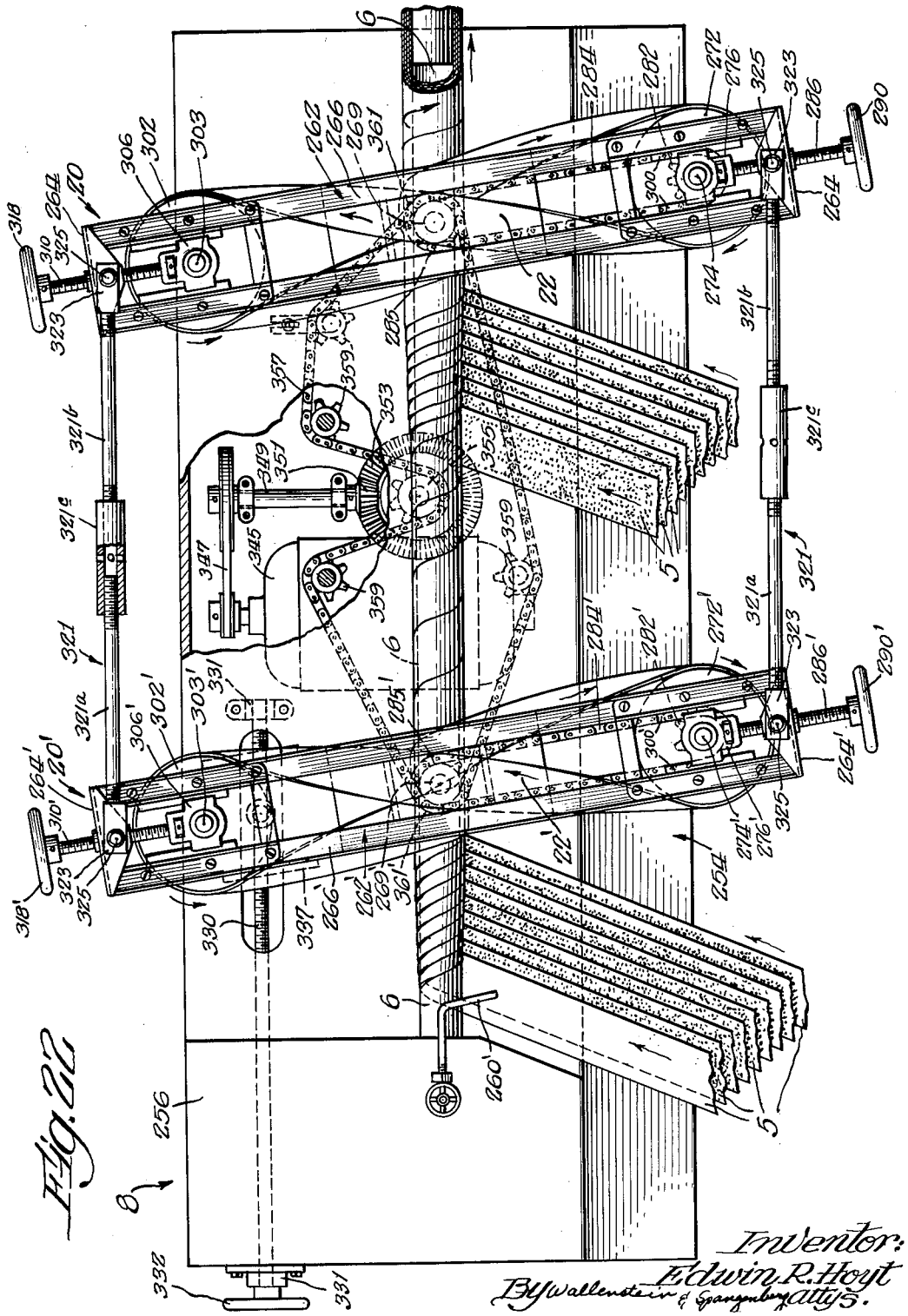
FIG. 22 is a plan view of the belt-supporting portion of the machine shown in FIG. 21.

Referring now more particularly to FIGS. 1 and 2, the spiral tube making machine of the present invention illustrated therein comprises two substantially identical strip applying units 2 and 2', the main difference between the two units being that one is arranged in inverted relation to the other so that the two appear as mirror images of one another. Accordingly, corresponding parts of the supply units will be similarly numbered with a prime added to the reference numbers associated with supply unit 2'. For the most part, therefore, only the details of one of the supply unit 2 will be described. The supply unit 2 has a roll carrying section 4 which supports rolls of the flexible strip material 5 to be fed to a horizontal mandrel 6 carried upon a mandrel and belt carrying unit 8. The strips on the rolls are oriented in vertical planes. As will be explained in more detail hereinafter, two stacks 10a and 10b of vertically spaced supply reels 12 are supported on this section of the supply unit with, in general, one stack being in use while the other stack supports a spare supply of rolls, each of which can be quickly secured to the end portion of a corresponding roll on the other stack when the latter is about used up, without requiring shutdown of the machine. In a manner to be explained, the strips of flexible material unwinding from the rolls are fed to a strip orienting and positioning section 14 of the supply unit. In this section of the machine, the strips 5 are twisted 90° so that the side edges thereof face horizontally, and are positioned in a precise vertically spaced overlapped relationship. Next, the strips are fed to an adhesive-applying section 16 of the machine where, by means to be explained, a thin layer of adhesive is applied to the still vertically spaced overlapped strips. The various portions of the supply unit 2 just described are all carried on a common frame 18 whose angular relation with respect to the mandrel 6 and the other frame 18' of supply unit 2' is adjustable.

The groups of overlapped strips supplied by the supply units 2 and 2' are fed to widely spaced points on the mandrel 6. The mandrel 6 is slightly tapered (in a direction toward the bottom portion of FIG. 1). The groups of overlapped strips are first brought into engagement next to the mandrel where they are wrapped therearound by belts 22—22' supported upon drum-supporting units 20—20'. The resulting tube slips toward the narrow end of the mandrel 6 so that the overlapped group of flexible strips 5 supplied by the supply unit 2' form the inner layers of the tube whereas the group of flexible strips 5 supplied by the other supply unit 2 form the outer section of the resulting tube. Now that the basic components of the machine have been introduced, the various details thereof in the preferred form of the machine will now be described.

*Frame of Supply Unit 2*

The roll-carrying section 4 of the supply unit 2, as well as the other aforesaid sections thereof, are supported on a common frame 18. The frame 18 has a base portion 24 which may be made of a number of longitudinally and transversely extending horizontal channel members 25, 26 and 27, etc. The left end of one of the longitudinal channel members 26 terminates short of the corresponding end of the other longitudinal member 25 and is joined to the latter by an angling channel member 28. A vertical cylindrical post 29 extends upwardly from the left hand end of the channel member 26. A similar vertical post 29 extends upwardly from the medial portion of the channel member 25. At the left hand end of the shorter horizontal channel member 26 and the corresponding position of the channel member 25, there extends upwardly a pair of vertical angle members 30—31. Two other pairs of vertical angle members 32—33 and 34—35 extend upwardly from longitudinally spaced points of the base channel members 25 and 26, the right hand angle members 34—35 being much shorter than the angle members 32—33. A transverse horizontal channel member 36 extends between the tops of the vertical angle members 34—35. A pair of relatively narrow vertical angle members 37—38 extend upwardly from the transverse horizontal channel member 36. A pair of side braces 39—39 incline downwardly from the right hand end of the frame 18 to support the end of a platform 40 resting on the transverse base channel member 27. A pair of longitudinal upper horizontal channel members 42 and 44 extend between the tops of the vertical angle members 32—33 and 34—35 to overlie the base channel members 25 and 26, and an angling channel member 46 extends between the left hand end of the channel member 44 so as to overlie the base angling channel member 28. Transverse horizontal angle and channel members 50 and 52, respectively, extend between the upper horizontal channel members 42 and 44. Longitudinal channel members 54 and 56 extend from transverse channel member 52 and a transverse channel member 57 extends between the ends of channel members 54 and 56 and over the vertical channel members 37 and 38. Intermediate longitudinal channel members 58 and 60 (FIGS. 4, 5 and 7) are also provided for bracing the frame.

The frame 18 carries a number of caster units 64, two such caster units being secured to the flanges of the upright angle members 34—35, two other such units being secured to the flanges of the upright angle members 30—31 and one such caster unit being secured by a bracket or otherwise to the left hand end of the frame base 24. As perhaps best shown in FIG. 4, each of the caster units comprises a hollow body 66 bolted to the frame 18, and body 66 having a downwardly opening channel in which is slidably supported a caster element 68 having universally mounted wheels 69. An elevation adjusting screw 70 is provided which threads through an upper wall of the body 66 and bears down upon the top of the caster element 66. When the screws 70 are threaded into the bodies 66, the frame 18 of the supply unit 2 is raised from the floor so that the same is supported upon the caster wheels 69. In this position the supply unit 2 can be moved about or turned at any desired angle with respect to the mandrel 6. When the screws 70 are unthreaded from the bodies 66, the frame 18 can be lowered to a point where it rests immovably upon the floor.

*Roll-Carrying Section 4*

One important aspect of the invention relates to the manner in which the supply reels 12 are supported and arranged on the frame 18. As perhaps most clearly shown in FIG. 10, each of the supply reels includes a circular roll support table 72 from the center of which upwardly extends a centering nipple 74 having a cylindrical base portion 76 and a tapered upper portion 78. The centering nipple is anchored to the table 72 and the table has a depending stub shaft 80 which is rotatably supported in ball bearings mounted on the end of a reel carrier arm 84. Each reel carrier arm 84 is shown in the form of a channel shaped sheet metal member which carries at the inner end thereof a hollow cylindrical hub or collar 86. To inhibit the free rotation of each reel table 72, braking means 85 is provided. The braking means includes a horizontally extending lever arm 82a which is pivotally mounted intermediate its ends upon a pivot pin 85b extending laterally from the carrier arm 84. A friction pad 85c is secured to the inner end of the lever arm 85a, which pad makes frictional engagement with the bottom of the associated reel table 72. At the outer end of the lever arm 85a there is provided a longitudinally adjustable weight 85d which adjusts the frictional force between the friction pad 85c and the table 72.

As previously indicated, the supply reels 12 together with the reel carrier arms 84 are arranged in vertical stacks 10a and 10b. To this end, the cylindrical hubs in each stack are positioned one on top of the other around one of the cylindrical vertical posts 29 or 29a of the frame 18 which form a pivot for the hubs. Where there are nine strips to be supplied by the supply unit 2, there are nine reel and carrier arm units on each of the posts 29 and 29a at corresponding elevations. Suitable spacer collars 90 and 92 are respectively positioned at the lower and upper ends of each of the posts 29 and 29a, the spacer collars being anchored to the posts by suitable bolt and nut means 94 (FIG. 10).

With the arrangement just described, it is apparent that each of the reel carrier arms 84 are swingable in individual horizontal planes between extreme positions spaced 180° apart where the arms extend generally transversely of the frame 18. The innermost of these positions is referred to as a strip feeding position and the outermost of these positions is referred to as a roll supplying position. Means for holding each of the arms in these positions are provided, such means being shown as spring-urged pin units 97 (FIG. 9) extending laterally from each of the hubs 86. The spring-urged pin units have pins 99 urged inwardly by a spring 100 through a lateral opening 102 in the hub. Each of the posts 29 and 29a has at the various levels thereof to be occupied by a supply reel and carrier arm unit a pair of pin-receiving holes 104—104 centered on a line extending longitudinally of the frame 18. In the roll supplying the position of each of the carrier arms, the associated spring 100 urges the shank of the pin into one of the post holes 104 to lock the carrier arm in this position. When the pin 99 is withdrawn from the latter hole, the carrier arm together with its supply reel can be rotated 180° into its inner strip feeding position where the spring 100 then urges the pin 99 into the other of the associated post pin-receiving holes 104 to hold the carrier arm in this position.

A boom assembly 106 is supported upon the top of the frame 18 above the roll carrying section 4 of the supply unit 2. The boom assembly includes a boom arm 108 which is pivotally supported at 110 on a superstructure 109 extending upwardly from the frame 18. A brace arm 111 angles downwardly from the boom arm 108 and is pivotally connected to the frame 109 at 112 about a pivot axis which is coextensive with the axis of pivot 110. The pivot axis of the boom arm 108 is located along a transverse line extending midway between the center points of the supply reels of the stacks 10a and 10b when the associated reel carrier arms are in their outer roll-supplying positions.

Lift mechanism 113 is supported from the boom arm 108 at a point which will overlie the center points of the supply reels 12 in the two stacks 10a and 10b when the boom is swung into positions respectively overlying the stacks 10a and 10b. The lift mechanism may comprise a motor driven pulley unit 114 by means of which a chain 116 may be moved between positions including the elevations of the supply reels as well as to an elevation thereabove. A hook 118 is carried at the bottom end of the chain 116. The movement of the chain 116 is controlled by a control unit 120 which has a pair of control push buttons 120a and 120b which respectively control the up and down movement of the chain 116 when these push buttons are momentarily depressed.

The hook 118 at the end of the chain 116 supports a reel carrier unit generally indicated by reference numeral 122. The reel carrier unit 122 has a circular platform 124 having a diameter approximately equal to that of the rolls of flexible strip material which they are to carry. An arcuate wall 125 of less than 180° extent projects upwardly from one end of the platform 124 to act as a positioning wall against which a roll of flexible strip material may be positioned when inserted upon the platform. At the opposite end of the platform 124 there is provided a radial slot 126 extending from the edge of the platform to the center of the platform in a direction toward the positioning wall 125. The slot 126 is sized slidably to receive the cylindrical base portion 76 of the centering nipples 74 of the supply reels 12.

The platform 124 is further provided with a series of roller means 130 which project a small distance above and below the top of the platform 124. In the illustrative form of the invention, the roller means each comprises a pair of vertically spaced cylindrical rollers 132—132 carried upon a frame 133 having a horizontal upper flange 134 fitting into a small recess 135 in the upper surface of the platform 124 where it is anchored by one or more screws 136 threading into a platform. The upper rollers 132 project the same small distance above the platform 124 and the lower rollers project the same distance below the platform. The rollers are rotatable about axes which extend transverse to the length of the slot 126. It is apparent, therefore, that a roll of flexible strip material may be readily slid in position upon the platform 124 to a point where it rests against the positioning wall 125. In this position of the roll, the usual hole 137 in the center of the roll of flexible material overlies the end portion of the slot 126 at the center of the circular carrier platform.

A pair of similar arms 138—138 extend upwardly from diametrically opposite points on the platform 124 and a short tab 140 extends upwardly from the top of the positioning wall 125 to an elevation which is approximately the same as the elevation of the tops of the arms 138—138. The arms 138—138 and the tab 140 have holes therein through which may be hooked the ends of separate chain sections 141 which are held in the crotch of the hook 118 at the bottom of the chain 116.

The procedure for loading the reel carrier unit and a supply reel 12 with a roll of flexible strip material may be as follows: The lift mechanism is first lowered to bring the carrier unit to the elevation of a dolly or other portable support platform which carries the rolls of flexible strip material to the situs of the tube making machine of the present invention. Then, a roll is slid off the dolly or portable platform upon the platform 124 of the carrier unit 122. The rollers 132 on the carrier unit platform enable the roll to be readily slid into position against the positioning wall 125. Next, the lift mechanism is operated to raise the carrier unit to an elevation slightly above the supply reel which is to be loaded, and the boom arm 108 is swung into a position overlying the supply reel involved after the associated carrier arm is pivoted into its roll supplying position. Then the carrier unit 122 is lowered into position upon the supply reel, the operator if necessary using the handle 142 beside the positioning wall 125 accurately to position the carrier unit upon the supply reel where the centering nipple 74 thereof is extended through the end portion of the carrier platform slot 126 and passes into the center opening 137 of the roll of flexible strip material involved. Then the carrier unit 122 may be simply removed from the bottom of the roll by grasping the handle 142 and pulling the same horizontally from beneath the roll. The rollers 132—132 projecting from the top and bottom of the platform 124 enable the carrier unit to be moved with relative ease, the bottom rollers 132 then rolling upon the flat upper surface of the table 72 of the supply reel 12. To permit the carrier unit to be so pulled from between the roll and the supply reel table, it is apparent that the half of the carrier unit platform including the slot 126 must be devoid of any upstanding projections other than the rollers 132.

When all of the supply reels have been loaded with rolls of flexible strip material, the stack of supply reels which are to be initially used for feeding the flexible strip material are pivoted into their inner strip feeding positions as exemplified by the supply reels of stack 10b in FIG. 1. The stack of supply reels which are not then active may be left in their outer roll supplying positions as in the case of stack 10a in FIG. 1. When the stack which is feeding the strips is stack 10a, the stack furthest from the mandrel, then the positioning of the spare stack 10b into its outer roll supplying position is usually mandatory to avoid interference with the unwinding of the strips in the active stack of supply reels. However, when the active stack of supply reels is the stack 10b nearest the mandrel, the outermost stack 10b can normally be left in the inner strip-feeding position because they do not then interfere with the unwinding of the flexible strips from the inner stack 10b.

When a roll of flexible strip material in an outermost stack 10a is nearly exhausted, the corresponding roll of flexible material in the inner stack of 10b may be fed through the machine without stopping the same by various methods, one of which is to apply a layer of adhesive material on the outer face of the end of the strip to be transferred into an active feeding position and then to swing the supply reel involved from its outer roll supplying position into its inner strip supplying position to bring the adhesive coated portion of the strip against the end portion of the strip of the roll which is almost exhausted. The last mentioned strip will then automatically thread the new strip into the proper position to be fed onto the mandrel.

When, on the other hand, the roll which is almost exhausted is on the inner stack 10b, the new roll of flexible strip material is secured to the end portion of the strip in the exhausted roll by unwinding a portion of the strip of the new roll when the supply reel of the latter is in an inner strip feeding position and adhesively securing such unwound end portion against the end portion of the old roll. During a roll transferring operation it is desirable to slow the machine down. Since an outer layer of the finished tube will require more strip material for a given length of tube than an inner layer thereof, it can be seen that the various rolls of flexible material will be exhausted in sequence rather than at the same time. The time delay between the exhaustion points of the various rolls is sufficiently great, particularly when the machine is slowed down, so that an operator can have sufficient time to transfer all of the new rolls in one stack into operative feeding conditions in the manner described.

*Strip Orienting and Positioning Section 14*

The strip orienting and positioning section 14 is on the intermediate portion of the supply unit frame 18. This section includes a vertical cylindrical drum or roller 145 which is mounted for free rotation in bearings 143 and 144 (FIG. 7) between the upper and lower channel members 42 and 25 at one side of the frame. The various vertically spaced strips 5 of flexible material leaving the various rolls on the supply reels involved extend under tension around one side of the roller 145 and then pass around the opposite sides of corresponding laterally and vertically spaces short vertical rollers 146 positioned at the same elevations as the associated supply reels 12. The roller 145 serves the purpose of equalizing the tension of the various strips of flexible material which may come off the associated rolls at varying angles depending upon the location and diameter of the rolls at the instant involved. It is possible, for example, for one of the strips to be unwinding from a roll in one of the stacks 10a with another strip is unwinding from another of the stacks 10b. In such case, it is apparent that both the diameter and position of the rolls involved would be substantially different.

The rollers 146 are journalled for rotation between the horizontal legs of angle members 148 extending between the upright angle members 30 and 31. The rollers 146 brace the associated strips of material for a 90° twist as shown most clearly in FIG. 7, which brings the strips into a horizontal plane which is the position the strips are to assume when they are applied to the mandrel 6. The twisted strips of flexible material then pass respectively through individual guide members 150 having vertical positions corresponding to that of the associated rollers 146.

Each of the guide members 150, the details of which will be described, is positioned for lateral adjustment upon a flanged sheet metal platform 152 shown most clearly in FIGS. 5 and 14–16. The various platforms 152 are arranged in vertically spaced relation upon a carrier unit generally indicated by reference numeral 154. The carrier unit 154 comprises a pair of laterally-spaced channel members 156—156 which are oriented with their flanges facing outwardly (FIG. 6). The carrier unit is supported for lateral adjustment upon upper and lower transverse, threaded rods 160 and 162, each of which passes through openings in the webs of the channel members 156—156 and also through openings in the vertical legs 168—168 of angle plates 170—170 respectively secured to the associated upper or lower pair of frame channel members 42—44 or 25—26. The upper and lower threaded rods 160 and 162 are fixed to the vertical legs of the associated angle plates by nuts 172—172 threaded around the rods on the opposite sides of the angle plate legs 168—168. The carrier unit 154 is laterally adjustable in position by varying the position of a pair of nuts 174—174 threaded around the rods 160 and 162 on opposite sides of the web of the vertical channel members 156—156.

Each guide member 150 includes a channel-shaped element 176 having laterally spaced vertical side walls 178—178 and a bottom support wall 180 bridging the bottom ends of the side walls. The side walls 178—178 are spaced apart approximately a distance equal to the width of the strip 5 of flexible material to be used therewith. The strips of flexible material are maintained in proper position against the bottom wall 180 of each of the guide members by means preferably including an inclined pressure plate 182 which is pivoted at one end to a lateral pivot pin 184 extending through openings in the rear portions of the side walls 178—178. The pressure plate 182 has a horizontally extending bottom portion 186 which makes face to face contact with the strip of flexible material involved. The pressure plate 182 is forced against the strip 5 with an adjustable pressure by means of an adjusting screw 188 threading through a cross arm 190 extending between the guide member side walls 178—178. The bottom wall 180 of the channel-shaped element 176 has secured thereto by any suitable means a depending threaded cylindrical extension 192 which passes through a transversely extending slot 194 in the associated flanged platform 152. The threaded extension 192 is slidable along the slot 194 and is lockable in any adjusted position therein by means including a wing nut 195 threadable over the extension 192 and bearing against a channel member 196 which provides an abutment shoulder against which the wing nut may bear. It is apparent that the degree of overlap of the strips can be adjusted by varying the relative lateral positions of the guide members 150.

Each of the various strips of flexible material leaving the guide member 150 passes under an individual horizontal cylindrical roller 200 journalled between the upright angle members 32 and 33 for rotation at the same elevation as the associated guide member 150. Each strip bends upwardly around the bottom of an associated horizontal cylindrical roller 202 journalled between the upstanding channel members 37 and 38 at an elevation above the associated guide member 150 but at the same lateral position occupied thereby. The strips of flexible material then incline downwardly into the adhesive-applying section of the supply unit 2.

*Adhesive-Applying Section 16*

The adhesive-applying section 16 of the supply unit 2 includes an open-top tank 204 supported upon the aforesaid platform 40 of frame 18. A drip pan 205 extends downwardly and forwardly between the supply unit frame 18 and the rear end of the top of the tank 204. The tank 204 is filled with a suitable liquid adhesive material 207, such as a fast drying dextran adhesive. The adhesive is kept in a highly fluid state by means including an electric heating rod 206 extending within the tank, and current control means therefor including a temperature-responsive unit 208 and an adjustable control unit 210 which, in any well known manner, adjusts the current flowing through the heating rod 206 to provide a substantially constant temperature in the tank. An outlet tube 212 (FIG. 7) located adjacent the bottom of the tank 204 communicates with the inlet side of a pump 214 (FIG. 2) driven by an electric motor 216 mounted on the outside of the tank or otherwise suitably supported on the frame 18. The pump forces the liquid adhesive through an outlet tube 218 having a master control valve 220. A series of branch lines 224 extending from longitudinally spaced points of the outlet tube 218 and each branch line has an individual control valve 226. There is one branch line for each strip of flexible material to be handled by the supply unit 2. The outlet tube 218 passes through a terminal control valve 228 and opens into an upper portion of the tank 204 where the excess adhesive drains back into the tank.

As shown most clearly in FIG. 6, the various branch lines 224 have horizontally laterally extending portions 224a and 224b, 224c etc. which are staggered longitudinally of the adhesive-supplying section of the supply unit and extend between the successive pairs of strips 5 and terminals in downwardly extending discharge nozzles 230a, 230b, 230c, etc. which are positioned opposite the medial portions of the strips of flexible material. The discharge nozzles 230a, 230b, 230c, etc. deposit a relatively narrow line of adhesive on the upper faces of the strips 5 of flexible material. Any adhesive which may drip from the strips beneath the discharge nozzles drips into the drip pan 205 or directly into the tank 204. No adhesive is applied to the uppermost strip, however, in supply unit 2′ and the nozzle corresponding to nozzle 230 i is, accordingly, left off supply unit 2′ or the associated valve 226′ turned off.

Each strip of flexible material bends under an individual horizontal Teflon roller 232 which is supported for rotation about a horizontal axis between laterally spaced angle members 234—234 extending longitudinally from and inclining slightly upwardly from the frame 18 of the supply unit. The rollers 232, of course, have the same lateral position as the associated rollers 202. Tie rods 236—236 are connected between the forward ends of the angle members 234—234 and the upper end of the frame 18. Teflon rollers are used because the dextran adhesive will not stick to the Teflon.

Means are provided for spreading the lines of adhesive across the full widths of the strips and for removing excess adhesive therefrom. This adhesive spreading and scraping means includes a series of laterally extending members 238 projecting inwardly from a vertical wall 240 secured to and extending above the tank 204. The members 238 are staggered vertically and longitudinally with the upper members located rearwardly of the subjacent members. Each of the members 238 has a semi-cylindrical end portion 242 made of Teflon or having an outer Teflon layer which makes contact with the upper surfaces of the respective strips of flexible material in a manner to be explained, an enlarged cylindrical intermediate portion 243 and a reduced opposite cylindrical end portion 244 which is rotatably mounted within a cylindrical opening 246 in the wall 240. The axis of the semi-cylindrical end portion 242 is coextensive with the axis of rotation of the member 238 in the opening 246. The members 238 may be locked in any adjusted angular position by any suitable means. In the illustrated embodiment of the invention, an elongated block 248 is secured to the rear face of the wall 240, the block containing threaded openings 250 in the upper face of the block through which the reduced cylindrical end portions 244 of the members 238 pass. Individual locking screws 252 thread into the openings 250 and bear on the associated member.

As shown most clearly in FIG. 17, the top of each of the members 238 extends to an elevation slightly above the bottom of the member 238 immediately thereabove. Each strip of flexible material passes under the semi-cylindrical end portion 242 of one of the members 238 and then over the top side of the subjacent member 238. In this manner, the semi-cylindrical end portions of the members 238 bear against the upper surfaces of the strips of flexible material to thereby spread the lines of adhesive across the entire widths of the strips and, at the same time, scrape away excess adhesive.

The degree of scraping action and hence the thickness of the resulting layer of adhesive material can be varied by adjusting the angular position of the members 238. As shown most clearly in FIG. 19, each of the semi-cylindrical end portions 242 of the members 238 has an outer cylindrical surface 242a and a sharply radially inwardly extending surface 242b. An intermediate degree of scraping action is obtained when the latter surface is positioned at right angles to the plane of the oncoming strip of flexible material as shown by the intermediate solid line position of the member 238 in FIG. 19. When the member 238 is rotated in a forward or counterclockwise direction (as viewed in FIG. 19) from this position to bring the flat surface 242b at right angles to the upwardly inclining portion of the strip of flexible material, the scraping action is at a maximum. Minimum scraping action is obtained when the member 238 is rotated in a rearward or clockwise direction from the aforesaid intermediate position.

The adhesive which is scraped from an upper strip will drip upon the next lower strip because of the overlapped relation of the strips. Therefore, the member 238 associated with a given strip of material should be located behind the member 238 associated with the strip beneath so that the latter member will scrape the excess adhesive which has dripped from an upper strip or strips.

All but the uppermost member 238 are provided with a pair of upwardly extending guide and scraper pins 253—253 which are spaced apart an amount equal to the width of the strips of flexible material, and are laterally positioned so as to receive there between the strips of flexible material which pass immediately thereabove. The pins thus aid in maintaining the desired overlap of the strips and scrape adhesive from the side edges of the strips.

The initial application of the adhesive in a narrow line followed by the spreading of the adhesive results in many important advantages. In the first place, the use of the nozzle drip method requires very little maintenance. When the machine is stopped, the adhesive in the nozzles and piping leading thereto will drain back into the tank 204. Also, since the tank 204 holds a large supply of adhesive, refilling is only infrequently required. All of the adhesive dispensed by the nozzle applied to the strips either remains on the strips or is removed by the spreading and scraping members 238, where any excess adhesive drips into the tank 204. As previously indicated, since all of the rollers and scrapers engaged by the adhesive coated strips are made of Teflon material, the adhesive does not adhere thereto. It is further apparent that the nozzles 230a, 230b etc. are usable with strips of any width since the width of the stream of adhesive dispensed thereby has no relation to the widths of the strips.

The strips of flexible material leaving the spreading and scraping members 238 are thus coated with a thin layer of fast drying adhesive material and are aligned in a precise vertically spaced overlapped relation. As previously indicated, the uppermost of the strips from the supply unit 2', however, has no adhesive thereon because this strip will be next to the mandrel 6. The strips are then brought together for the first time upon the mandrel 6 and then wrapped therearound by the belts 22 and 22' supported upon and driven by the mandrel and belt-carrying unit 8.

As previously indicated, the angles at which the strips of flexible material are fed to the mandrel 6 by the supply units 2 and 2' depend upon several factors, one being the diameter of that portion of the tube which the strips involved are to occupy. The angle of approach of the strips of each group is preferably such that a single twist of the strips around the mandrel will bring the edges of one winding in abutment with or at least contiguous to the edges of the adjacent winding. In such case, it is apparent that the larger the diameter of that portion of the tube to be occupied by the group of strips involved, the smaller the angle between the strips and the mandrel. Since the supply unit 2' supplies the inner layers of the tube being made by the machine, the angle at which the strips fed therefrom will approach the mandrel should, for best results, be somewhat greater than the angle of approach of the strips applied by the supply unit 2. For this reason, the two supply units 2 and 2' are independently adjustable in angle with respect to the mandrel.

*Mandrel and Belt-Carrying Unit*

The unit 8 includes a base portion 254 which forms a housing for an electric motor and gearing for driving the belts 22 and 22', respectively associated with the strips of material fed by the supply units 2 and 2'. The housing has a head portion 256 from which projects the stationary mandrel 6 which tapers slightly toward the outer end thereof, so that the tube formed thereon will automatically work its way toward the outer end thereof where it is removed from the mandrel. The strips of flexible material reaching the mandrel 6 from the supply units 2 and 2' are fed beneath the mandrel at longitudinally spaced points therealong, as shown most clearly in FIG. 1. The uppermost of the strips fed to the mandrel from supply unit 2' becomes the innermost strip on the mandrel, and, as above indicated, the upper face thereof is, accordingly, not coated with adhesive so that it will not stick to the mandrel. To facilitate the sliding of the tube down the mandrel, means are provided for depositing an oil upon the upper surface of the uppermost strip delivered by supply unit 2'. This means includes a discharge tube 260 which continuously drops oil upon the upper surface of the uppermost strip just as it is about to make engagement with the bottom of the mandrel.

The belts 22 and 22' are respectively supported upon the substantially identical belt-supporting units 20 and 20'. Since these two units are, for the most part, identical, only unit 20' will be described in detail and the corresponding elements of the two units will be similarly numbered except that a prime (') will follow the numbers for unit 20'. The unit 20' rather than unit 20 will be described in detail because the former has one additional part to be described.

The belt-supporting unit 20' has a generally rectangular frame 262' having vertical end walls 264'—264' and upper and lower hollow frame sections 266' and 268'. The belt-supporting unit 20' has a depending stub shaft 269' at the center thereof which is journalled for rotation about a vertical axis passing through the axis of the mandrel 6 in ball bearing assemblies 270'. The mandrel 6 passes through the center of the frame 262' (and 262 of the belt-supporting unit 20). The belt-driving drum 272' is located on one side of the mandrel 6, the belt-driving drum 272' having a knurled or otherwise roughened outer surface. The drum is supported for rotation about a generally vertical axis between the upper and lower frame sections 266' and 268'. The belt 22' wraps once around the tube being fabricated. To obtain proper wrapping action which does not put undue strain on the strips of material being wrapped, it is important to keep the belt 22' at a point on the drum 272' where the center line of the belt is directed generally longitudinally to the side of the mandrel at which the belt is looped around the mandrel. It is thus apparent that the angle of the axis of the belt-driving drum 272' should be somewhat variable in a vertical longitudinal plane with the diameter of the tube involved. Means are, therefore, provided for both rotatably supporting and adjustably tilting the axis of the belt-driving drum 272' over a limited extent in a vertical plane extending longitudinally of the frame 262'. To this end, the drum 272', accordingly, has an upper stub shaft 274' which is rotatably mounted in and carried by a pivot-forming slide unit 276', and a lower stub shaft 278' which is rotatably mounted in and carried by a pivot-forming slide unit 280'. The lower stub shaft 278' carries a sprocket wheel 282' around which extends a chain 284' driven by a drive sprocket wheel 285' around which it extends, the drive sprocket wheel 285' being mounted on said stub shaft 269' on which the frame 262' is rotatable.

The pivot-forming slide units 276' and 280' are respectively carried on the ends of upper and lower screw shafts 286' and 288' having hand wheels 290' and 292' at the outer ends thereof. The screw shafts 276' and 278' are respectively threaded into holes 294' and 296' in the end of the upper and lower frame sections 266' and 268'. Both the pivot-forming slide units 276' and 280' may respectively be slidably supported on the associated frame sections, in any suitable manner. For example, as shown in FIG. 23, each of these slide units has horizontal slide channels 298'—298' or the like which slide loosely over lateral slide blocks 300'—300' formed on the associated frame section. The resultant lateral play between the slide channels 298'—298' and the slide blocks 300'—300' permits the angle of the axis of the belt-driving drum 272' to be varied over narrow limits by adjusting the handwheels 290' and 292' so that the upper and lower ends of the drum stub shafts 274' and 279' are spaced unequally from the mandrel 6.

A belt-receiving drum 302' having a smooth outer surface is supported for rotation about a generally vertical axis between the upper and lower frame sections 266' and 268' on the side of the mandrel opposite the belt-driving drum 262'. The drum 302' has upper and lower stub shafts 303' and 304' which are respectively rotatably supported and carried by pivot-forming slide units 306' and 308' which are similar to the slide units 276' and 280' previously described. The slide units 306' and 308' are carried on the ends of screw shafts 310' and 312' respectively which thread into openings 314' and 316' in the corresponding end of the upper and lower frame sections 266' and 268'. Hand wheels 318' and 320' are respectively connected to the outer ends of the screw shafts 310' and 312'. By rotating the hand wheels 318' and 320', the spacing of the belt-receiving drum 302' can be varied from the mandrel 6 to thereby adjust the tension in the belt 22' and the angle of the drum axis.

The two belt-supporting units 20 and 20' are preferably ganged or joined together so that the two can be rotated about their central points simultaneously. To this end, there is provided at each end of the frames 262 and 262' a pair of adjustable length tie-rod assemblies 321-322 respectively extending between the upper and lower frame sections of the frames 262 and 262'. Each of these adjustable tie-rod assemblies comprises a pair of rods like 321a—321b which threaded into a center sleeve member like 321c. The opposite ends of the tie rods are connected to pivot members like 323—324 pivotally supported on pivot pins 325—326 on the adjacent ends of the lower or upper frame sections in any suitable manner. The frames 262 and 262' and their tie-rod assemblies extend generally along the perimeter of a parallelogram. The length of each tie-rod assembly is individually adjustable, however, for reasons including the fact that, as previously indicated, it is often desirable to operate one of the belts at a slightly different angle than the other belt in accordance with the disparity in the angles at which the associated strips are fed from supply units 2 and 2' to the mandrel. This angular difference is, of course, obtained by varying the lengths of the tie-rod assemblies. The use of four (instead of one or two) tie-rod assemblies respectively connecting the opposite ends of the upper and lower frame sections of the belt-supporting units 20 and 20' is particularly important firmly to brace the frames 262 and 262' to fix the angle of the belt 22 and 22' to provide high quality tubes.

The means for adjusting the angle of the frames 262 and 262' includes a longitudinal screw shaft 330 supported in bearings 331—331' for rotation within the base 254. The screw shaft 330 which carries a hand wheel 332 threads into an opening 334 in a nut 335. A coupling member 337 is rotatably mounted upon the nut 335 by means including a pivot screw 339 which passes through an opening 340 in the coupling member 337 and threads into the nut 335. The coupling 337 has a U-shaped track 342 within which the lower frame section 268' of the belt-supporting unit 20' may slide. It is thus apparent that by rotating the hand wheel 332, the longitudinal position of the nut 335 upon the screw shaft 330 will vary thereby to vary the angular position of the belt-supporting unit 20'. Because of the aforesaid tie-rod connections between this belt-supporting unit and the other unit 20, the latter unit will rotate with the rotation of the former.

The means for transmitting power to the shafts of the belt-driving drums 272 and 272' can be best explained by referring to FIGS. 20 and 22. As shown in the latter figure, an electric motor 345 is mounted within the base 254 and a belt transmission system 347 transmits power from the motor to a stub shaft 349 driving a bevel gear 351. The bevel gear 351 meshes with another bevel gear 353 which drives a chain sprocket wheel 355. A chain 357 meshes with the sprocket wheel 355 and also with a series of idler sprocket wheels 359. One end of the chain 357 extends around a sprocket wheel 361' fixedly secured to the aforesaid stub shaft 269' carrying the drive sprocket wheel 285' coupled to the belt-driving drum 272' by chain 284'. Similarly, the other end of the chain 357 extends around a sprocket wheel 361 secured to stub shaft 269 carrying a drive sprocket wheel 285 coupled by a chain 284 to the belt-driving drum 272. It is apparent that pivotal movement of the frames 262 and 262' about an axis passing through the axis of the mandrel 6 and also including the axis of rotation of the sprocket wheels 261 and 361' that the belt-supporting units 20 and 20' can be rotated during operation of the machine, since the spacing between the various points of the chain drive transmission do not vary with the angle of rotation of the units 20 and 20'.

It should be apparent from a description of the machine made above, that the present invention has numerous advantages including that of compactness, flexibility, adjustability during operation and reliability while operating at relatively high production speeds.

It should be understood that numerous modifications may be made of the most preferred form of the invention described above without deviating from the broader aspects of the invention.

What I claim as new and desire to protect by Letters Patent of the United States is:

1. In a machine for making laminated spiral wound tubes and including a horizontal mandrel and means for wrapping overlapping strips of flexible material around said mandrel to form the tube, the improvement in means for holding and guiding the strips of flexible material fed to said mandrel comprising: a stack of vertically spaced rolls of said strips of flexible material mounted for rotation about a common vertical axis coextensive with the longitudinal roll axis so as to present strips of flexible material in a vertical plane, guide means around which the strips of flexible material leaving the rolls extend and which brace the same for a 90° twist which brings the plane of the strips of flexible material into a position where the side edges thereof face horizontally, and guide means for bringing the twisted strips into adjacent overlapping relation and applying the same in this position upon said horizontal mandrel.

2. In a machine for making laminated spiral wound tubes and including a horizontal mandrel and means for wrapping overlapping strips of flexible material around said mandrel to form the tube, the improvement in means for holding and guiding the strips of flexible material fed to said mandrel comprising: a stack of vertically spaced supply reels adapted to support removably on the tops thereof respective rolls of said strips of flexible material oriented with their axes vertical so as to present strips of flexible material in a vertical plane, said stack of supply reels being supported for rotation on the ends of separately swingable reel carrier arms, each of said arms being individually movable in a horizontal plane between strip feeding and roll supplying positions which are 180° apart, guide means around which the strips of flexible material extend after leaving the supply reels when the associated reel carrier arms are in their strip feeding positions and which brace the same for a 90° twist which brings the plane of the strips of flexible material into a position where the side edges thereof face horizontally, and guide means for bringing the twisted strips into adjacent overlapping relation and applying the same in this position upon said horizontal mandrel.

3. In a machine for making laminated spiral wound tubes and including a horizontal mandrel and means for wrapping overlapping strips of flexible material around said mandrel to form the tube, the improvement in means for holding and guiding the strips of flexible material fed to said mandrel comprising: a stack of vertically spaced supply reels adapted to support removably on the tops thereof respective rolls of said strips of flexible material oriented with their axes vertical so as to present strips or flexible material in a vertical plane, said stack of supply reels being supported for rotation about a common vertical axis on the ends of separately swingable reel carrier arms, each of said arms being individually movable in a horizontal plane between strip feeding and roll supplying positions which are 180° apart, means for releasably locking said arms in said positions, guide means around which the strips of flexible material extend after leaving the supply reels when the associated reel carrier arms are in their strip feeding positions and which brace the same for a 90° twist which brings the plane of the strips of flexible material in to a position where the side edges thereof face horizontally, and guide means for bringing the twisted strips into adjacent overlapping relation and applying the same in this position upon said horizontal mandrel.

4. In a machine for making laminated spiral wound tubes and including a mandrel and means for wrapping overlapping strips of flexible material around said mandrel to form the tube, the improvement in means for holding and guiding the strips of flexible material fed to said mandrel comprising: a pair of similar, adjacent, longitudinally spaced stacks of vertically spaced supply reels adapted to support removably on the tops thereof respective rolls of said strips of flexible material oriented with their axes vertical so as to present strips of flexible material in a vertical plane, the supply reels of each stack being supported for rotation about a common vertical axis on the ends of separately swingable reel carrier arms, each of said arms being individually movable in a horizontal plane between strip feeding and roll supplying positions which are 180° apart on a line generally transverse to a line extending between the adjacent stacks of reels, and means for releasably locking said arms in said positions.

5. In a machine for making laminated spiral wound tubes and including a horizontal mandrel and means for wrapping overlapping strips of flexible material around said mandrel to form the tube, the improvement in means for holding and guiding the strips of flexible material fed to said mandrel comprising: a pair of similar, adjacent stacks of vertically spaced supply reels adapted to support removably on the tops thereof respective rolls of said strips of flexible material oriented with their axes vertical so as to present strips of flexible material in a vertical plane, the supply reels of each stack being supported for rotation about a common vertical axis on the ends of separately swingable reel carrier arms, each of said arms being individually movable in a horizontal plane between strip feeding and roll supplying positions which are 180° apart on a line generally transverse to a line extending between the adjacent stack of reels, guide means around which the strips of flexible material extend after leaving the supply reels when the associated reel carrier arms are in their strip feeding positions and which brace the same for a 90° twist which brings the plane of the strips of flexible material into a position where the side edges thereof face horizontally, and guide means for bringing the twisted strips into adjacent overlapping relation and applying the same in this position upon said horizontal mandrel.

6. In a machine for making laminated spiral wound tubes and including a horizontal mandrel and means for wrapping overlapping strips of flexible material around said mandrel to form the tube, the improvement in means for holding and guiding the strips of flexible material fed to said mandrel comprising: a pair of similar, adjacent stacks of vertically spaced supply reels adapted to support removably on the tops thereof respective rolls of said strips of flexible material oriented with their axes vertical so as to present strips of flexible material in a vertical plane, the supply reels of each stack being supported for rotation about a common vertical axis on the ends of separately swingable reel carrier arms, each of said arms being individually movable in a horizontal plane between strip feeding and roll supplying positions which are 180° apart on a line generally transverse to a line extending between the adjacent stacks of reels, means for releasably locking said arms in said positions, a boom supported above said stack of supply reels for swinging movement between two positions where the end of the boom respectively overlies the ends of the reel carrier arms in said stacks when the latter are in said roll supplying positions, and means carried on the end of said boom for supporting a roll of said flexible material for movement between and above the elevations of said reel carrier arms.

7. In a machine for making laminated spiral wound tubes and including a horizontal mandrel and means for wrapping overlapping strips of flexible material around said mandrel to form the tube, the improvement in means for holding and guiding the strips of flexible material fed to said mandrel comprising: a pair of similar, adjacent stacks of vertically spaced supply reels adapted to support removably on the tops thereof respective rolls of said strips of flexible material oriented with their axes vertical so as to present strips of flexible material in a vertical plane, the supply reels of each stack being supported for rotation about a common vertical axis on the ends of separately swingable reel carrier arms, each of said arms being individually movable in a horizontal plane between strip feeding and rolls supplying positions which are 180° apart on a line generally transverse to a line extending between the adjacent stacks of reels, means for releasably locking said arms in said positions, a boom supported above said stack of supply reels for swinging movement between two positions where the end of the boom respectively overlies the ends of the reel carrier arms in said stacks when the arms are in said roll supplying positions, means carried on the end of said boom for supporting a roll of said flexible material for movement between and above the elevations of said reel carrier arms, guide means around which the strips of flexible material extend after leaving the supply reels when the associated reel carrier arms are in their strip feeding positions and which brace the same for a 90° twist which brings the plane of the strips of flexible material into a position where the side edges thereof face horizontally, and guide means for bringing the twisted strips into adjacent overlapping relation and applying the same in this position upon said horizontal mandrel.

8. In a machine for making laminated spiral wound tubes and including a horizontal mandrel, and means for wrapping overlapping strips of flexible material around two longitudinally spaced points on said mandrel to form a laminated tube, the improvement in means for supplying strips of flexible material to said mandrel comprising: first and second juxtaposed supply units arranged opposite longitudinally spaced points on said mandrel and each having its own frame, support means for each frame enabling the independent adjustment of the angular position thereof relative to the other frame and the mandrel, each supply unit frame further carrying spaced supply reels supported for rotation about a common vertical axis and adapted to support on the tops thereof respective rolls of said strips of flexible material with their axes vertical so as to present strips of flexible material in a vertical plane, each supply unit frame further carrying guide means around which the strips of flexible material extend after leaving the supply reels and which brace the same for a 90° twist to bring the strips of flexible material to a position where the side edges thereof face horizontally, and guide means for bringing the twisted strips into adjacent overlapping relation and applying the same in this position upon said horizontal mandrel.

9. In a machine for making laminated spiral wound tubes and including a horizontal mandrel, and means for wrapping overlapping strips of flexible material around two longitudinally spaced points on said mandrel to form a laminated tube, the improvement in means for supplying strips of flexible material to said mandrel comprising: first and second juxtaposed supply units arranged opposite longitudinally spaced points on said mandrel and each having its own frame, support means for each frame enabling the independent adjustment of the angular position thereof relative to the other frame and the mandrel, each supply unit frame further carrying a stack of vertically spaced supply reels adapted to support on the tops thereof respective rolls of said strips of flexible material oriented with their axes vertical so as to present strips of flexible material in a vertical plane, the supply reels being supported for rotation about a common vertical axis on the ends of separately swingable reel carrier arms, the arms of said respective supply units being swingable in opposite directions in a horizontal plane between inner strip feeding and outer roll supplying positions, means for releasably locking said arms in said positions, each supply unit frame further carrying guide means around which the strips of flexible material extend after leaving the supply reels when the associated reel carrier arms are in their strip feeding positions and which brace the same for a 90° twist to bring the strips of flexible material to a position where the side edges thereof fan horizontally, and guide means for bringing the twisted strips into adjacent overlapping relation and applying the same in this position upon said horizontal mandrel.

10. In a machine for making laminated spiral wound tubes including a horizontal mandrel, and means for wrapping overlapping strips of flexible material around said mandrel to form the tube, the improvement in means for supplying strips of flexible material to said mandrel comprising: a supplying unit having a frame, support means for the frame enabling adjustment of the angular position thereof relative to the mandrel, said frame further carrying a pair of similar adjacent stacks of vertically spaced supply reels adapted removably to support on the tops thereof respective rolls of said strips of flexible material oriented with their axes vertical so as to present strips of flexible material in a vertical plane, the supply reels of each stack being supported for rotation about a common vertical axis on the ends of separately swingable reel carrier arms, each of said arms being individually movable in a horizontal plane between roll supplying and strip feeding positions which are 180° apart on a line extending generally transversely to a line extending between the adjacent stack of reels, means for releasably locking said arms in said positions, a boom supported above said stacks of supply reels for swinging movement between two positions where the end of the boom respectively overlies the ends of the reel carrier arms in said stacks when the arms are in said roll supplying positions, roll carrier means on the end of said boom for supporting a roll of said flexible material for movement between and above the elevations of said reel carrier arms, said frame further carrying guide means around which the strips of flexible material extend after leaving the supply rolls when the associated reel carrier arms are in their strip feeding positions and which brace the same for a 90° twist to bring the strips of flexible material into a position where the side edges thereof face horizontally and guide means for bringing the twisted strips into adjacent overlapping relation and applying the same in this position upon said horizontal mandrel.

11. In a machine for making laminated spiral wound tubes, said machine including a mandrel and means for wrapping overlapping strips of flexible material around the mandrel to form the tube, the improvement in means for supplying the overlapping strips of flexible material around said mandrel comprising: supply reels mounted for rotation about a vertical axis, each of said supply reels having a horizontal roll support table from the center portion of which upwardly extends a roll centering nipple extendable into a correspondingly sized opening in the center of the roll of flexible material with which it is to be used, a roll carrier unit for removably supporting a roll of said flexible material to be inserted upon the top of one of the supply reel tables, said roll carrier unit comprising a generally flat horizontal roll support platform having upwardly extending roll positioning means at one end against which the roll of said flexible material is positioned to fix the position of the roll on the platform, said platform having a slot extending from the platform edge at the other end of the platform which is devoid of any upstanding projections which would impede relative horizontal separation of the roll and the roll carrier unit in the direction of said slot, said slot slidably receiving said centering nipple on the table of any of said reels, and lift means for carrying said roll carrier unit into positions overlying any of said supply reels where the roll carrier unit is over the associated roll centering nipple and the roll centering nipple passes through the slot in the carrier unit platform and into the opening of the roll of flexible material involved, the roll carrier unit being readily removable from beneath the latter roll to leave the same in a centered position upon the table of the supply reel involved.

12. In a machine for making laminated spiral wound tubes, said machine including a mandrel and means for wrapping overlapping strips of flexible material around the mandrel to form the tube, the improvement in means for supplying the overlapping strips of flexible material around said mandrel comprising: supply reels mounted for rotation about a vertical axis, each of said supply reels having a horizontal roll support table from the center position of which upwardly extends a roll centering nipple extendable into a correspondingly sized opening in the center of the roll of flexible material with which it is to be used, a roll carrier unit for removably supporting a roll of said flexible material to be inserted upon the top of one of the supply reel tables, said roll carrier unit comprising a generally flat horizontal roll support platform having upwardly extending roll positioning means at one end against which the roll of said flexible material is positioned to fix the position of the roll on the platform, said platform having a slot extending from the platform edge at the other end of the platform which is devoid of any upstanding projections which would impede relative horizontal separation of the roll and the roll carrier unit in the direction of said slot, said slot slidably receiving said centering nipple on the table of any said reels, lift means for carrying said roll carrier unit into positions overlying any of said supply reels where the roll carrier unit is over the associated roll centering nipple and the roll centering nipple passes through the slot in the carrier unit platform and into the opening of the roll of flexible material involved, and roller means on the top of said carrier unit platform for enabling the carrier unit to be readily moved from beneath a roll of flexible material to leave the same in a centered position upon the table of the supply reel involved.

13. In a machine for making laminated spiral wound tubes, said machine including a mandrel and means for wrapping overlapping strips of flexible material around the mandrel to form the tube, the improvement in means for supplying the overlapping strips of flexible material around said mandrel comprising: frame support means carrying a number of vertically spaced reel carrier arms mounted for swinging movement about a common vertical axis between a strip feeding position and a roll supplying position which are substantially 180° apart, means for releasably locking said arms in said extreme positions, supply reels carried on the ends of said reel carrier arms and mounted thereon for rotation about a vertical axis, each of said supply reels having a horizontal roll support table from the center portion of which upwardly extends a roll centering nipple extendable into a correspondingly sized opening in the center of the roll of flexible material with which it is to be used, a roll carrier unit for removably supporting a roll of said flexible material to be inserted upon the top of one of the supply reel tables when the associated reel carrier arm has been pivoted into its roll supplying position, said roll carrier unit comprising a generally flat horizontal roll support platform having upwardly extending roll positioning means at one end against which the roll of said flexible material is positioned to fix the position of the roll on the platform, said platform having a slot extending from the platform edge at the other end of the platform which is devoid of any upstanding projections which would impede relative horizontal separation of the roll and the roll carrier unit in the direction of said slot, said slot slidably receiving said centering nipple on the table of any of said reels, and lift means for carrying said roll carrier unit into positions overlying any of said supply reels when the associated reel carrier arms are swung into its roll supplying position where the roll carrier unit is over the associated roll centering nipple where the latter passes through the slot in the carrier unit platform and into the center opening of the roll of flexible material involved, the roll carrier unit being readily removable from beneath the latter roll to leave the same in a centered position upon the table of the supply reel involved.

14. Means for applying adhesive to strips of advancing flexible material, said means comprising guide means for orienting said strips in a position where the side edges thereof are directed sideways, adhesive-applying means positioned above said strips to drop liquid adhesive upon the upper faces of said strips of material, adhesive scraping means overlying each of the strips of material for wiping away excessive adhesive, each of the scraping means comprising a generally laterally and horizontally extending member rotatable about a horizontal lateral axis and having a segmental cylindrical peripheral surface positioned to bear upon the upper surface of the associated strip and falling along a cylinder whose axis is coextensive with said horizontal lateral axis, and a sharp inwardly extending surface providing a relatively sharp rearwardly facing adhesive scraping edge, and means for catching the excess adhesive scraped from the strips.

15. Means for applying adhesive to strips of advancing flexible material, said means comprising guide means for orienting said strips in a position where the side edges thereof are directed sideways, adhesive-applying means positioned above said strips to drop a relatively narrow band of liquid adhesive upon the upper faces of said strips of material, adhesive spreading and scraping means overlying each of the strips of material for spreading the adhesive across the entire widths of the strips and wiping away excessive adhesive, each spreading and scraping means comprising a generally laterally and horizontally extending member rotatable about a horizontal lateral axis and having a segmental cylindrical peripheral surface positioned to bear upon the upper surface of the associated strip and falling along a cylinder whose axis is coextensive with said horizontal lateral axis, and a sharp inwardly extending surface providing a relatively sharp rearwardly facing adhesive scraping edge, and means for catching the excess adhesive scraped from the strips.

16. Means for applying adhesive to strips of advancing flexible material, said means comprising guide means for orienting portions of said strips in a downwardly and forwardly inclining direction with the side edges thereof directed sideways, adhesive-applying means positioned above said strips to drop a relatively narrow band of liquid adhesive upon the central portion of the upper faces of said strips of material, adhesive spreading and scraping means overlying the downwardly and forwardly inclining portions of each of said strips of material for spreading the adhesive across the entire widths of the strips and wiping away excessive adhesive, each of said adhesive spreading and scraping means including means for scraping the excessive glue from the side edges of said strips, and means for catching excess adhesive scraped from the strips.

17. Means for applying adhesive to strips of advancing flexible material, said means comprising guide means for holding portions of said strips in vertically spaced and overlapping relation with the side edges thereof directed sideways, adhesive-applying means positioned to be between said vertically spaced portions of said strips and to drop liquid adhesive on the upper faces of said strips, a number of longitudinally spaced adhesive scraping means overlying said respective overlapping strips of material for wiping away excess adhesive thereon, each adhesive scraping means being behind the scraping means associated with the strip beneath the same, excess adhesive dripping down from an upper strip upon a strip thereby being wiped away by the scraping means associated with the strips below it, and means for catching the excess adhesive dropping from the strips.

18. Means for applying adhesive to strips of advancing flexible material, said means comprising guide means for holding portions of said strips in vertically spaced and overlapping relation and inclining the same downwardly in a forward direction with the side edges thereof directed sideways, adhesive-applying means positioned to be between said vertically spaced and inclined portions of said strips and to drop a relatively narrow band of liquid adhesive on the upper faces of said strips, a number of longitudinally spaced adhesive spreading and scraping means respectively overlying the downwardly and forwardly inclining portions of said strips of material for spreading the adhesive across the entire widths of the strips and wiping away excess adhesive, each of said adhesive spreading and scraping means being behind the spreading and scraping means associated with the strip beneath the same, excess adhesive dripping down from an upper strip upon a strip thereby being wiped away by the spreading and scraping means associated with the strips below it, and means for catching the excess adhesive dropping from the strips.

19. In a machine for making laminated spiral wound tubes including a horizontal mandrel and means for wrapping overlapping strips of flexible material around said mandrel, guide means ahead of said mandrel for holding portions of said strips in vertically spaced and overlapping relation and inclining the same downwardly in a forward direction with the side edges thereof directed sideways, adhesive-applying means positioned to be between said vertically spaced and inclined portions of said strips and to drop a relatively narrow band of liquid adhesive on the upper faces of said strips, a number of longitudinally spaced adhesive spreading and scraping means respectively overlying the downwardly and forwardly inclining portions of said strips of material for spreading the adhesive across the entire widths of the strips and wiping away excess adhesive, each of said adhesive spreading and scraping means being behind the spreading and scraping means associated with the strip beneath the same, excess adhesive dripping down from an upper strip upon a strip thereby being wiped away by the spreading and scraping means associated with the strips below it, each of said spreading and each adhesive scraping means having a pair of laterally spaced upwardly extending guide means between which the strip immediately above the same slidably passes to wipe excessive adhesive therefrom and aid in keeping the desired overlap of the strips, and means for catching the excess adhesive dropping from the strips.

20. In a machine for making laminated spiral wound tubes including a mandrel and means for wrapping overlapping strips of flexible material around said mandrel, the improvement in means for supplying the overlapping strips of flexible material to said mandrel comprising: a support frame including a pair of laterally spaced side members, a guide carrier unit mounted between said side members for lateral adjustment therebetween, said guide carrier unit including a first series of spaced guide means which are individually laterally adjustable on the guide carrier unit for varying the degree of overlap of the strips, each of said guide means comprising a channel-shaped unit having a bottom support wall bridging a pair of side walls between which one of said strips slidably pass, and adjustable strip hold down means for urging said strip against said support wall under an adjustable pressure.

21. In a machine for making laminated spiral wound tubes including a horizontal mandrel and means for wrapping overlapping strips of flexible material around said mandrel, the improvement in means for supplying the overlapping strips of flexible material to said mandrel comprising: means for supporting rolls of said strips of flexible material for rotation about a common vertical axis and with the plane of the strips vertical, means for bracing said strips for a 90° twist, a first series of vertically spaced guide means which are individually laterally adjustable for varying the degree of overlap of the twisted strips, means for applying a coating of adhesive to the vertically spaced and overlapped strips, and means for bringing the coated strips into engagement for the first time adjacent said mandrel.

22. In a machine for making laminated spiral wound tubes including a horizontal mandrel and means for wrapping overlapping strips of flexible material around said mandrel, the improvement in means for supplying the overlapping strips of flexible material to said mandrel comprising: means for supporting rolls of said strips of flexible material for rotation about a common vertical axis and with the plane of the strips vertical, means for bracing said strips for a 90° twist, a first series of vertically spaced guide means which are individually laterally adjustable for varying the degree of overlap of the twisted strips, each of said guide members comprising a channel-shaped unit having a bottom support wall bridging a pair of side walls between which one of said strips slidably pass, adjustable strip hold down means for urging said strip against said support wall under an adjustable pressure, means for applying a coating of adhesive to the vertically spaced overlapped strips, and means for bringing the adhesive coated strips into engagement for the first time adjacent said mandrel.

23. In a machine for winding strips of flexible material around a horizontal mandrel by moving an endless belt helically wrapped around the strips applied over the mandrel, the improvement in means for supporting and driving the belt comprising: an upstanding frame unit through which said horizontal mandrel extends, the frame unit being mounted for angular adjustment about a vertical axis passing through the axis of the mandrel, said frame unit carrying a belt-driving drum on one side of the mandrel around which drum one end of one of said belts passes, a belt-receiving drum on the side of the mandrel around which belt-receiving drum the other end of the belt passes, respective adjustable means supporting opposite ends of each of said drums for rotation about an axis generally parallel to the axis of rotation of the associated frame unit, the adjustable means permitting limited adjustment of the spacing of each drum from the mandrel and also the angle of the axis of rotation of the drum in a vertical plane extending between the drums, the adjustment of the angle of the drum axes of rotation enabling maintenance of the belt in a medial position thereon.

24. In a machine for winding strips of flexible material around a horizontal mandrel by moving an endless belt helically wrapped around the strips applied over the mandrel, the improvement in means for supporting said belt comprising: an upstanding frame unit through which said mandrel extends, said frame unit having vertically spaced upper and lower frame sections, a belt-driving drum at one end of the frame unit on one side of said mandrel between said upper and lower frame sections and a belt-receiving drum at the other end of the frame unit on the other side of said mandrel between the upper and lower frame sections thereof, means for supporting said belt-driving drum for rotation about a generally vertical axis, said last mentioned means comprising first and second adjustable means respectively carried by the upper and lower frame sections, and being independently adjustable separately to vary the spacing of each end of the belt-driving drum with respect to said mandrel which adjusts the angle of the drum axis with respect to the vertical, and means for supporting said belt-receiving drums for rotation about a generally vertical axis.

25. In a machine for winding strips of flexible material around a horizontal mandrel by moving an endless belt helically wrapped around the strips applied over the mandrel, the improvement in means for supporting said belt comprising: an upstanding frame unit through which said mandrel extends, said frame unit having vertically spaced upper and lower frame sections, a belt-driving drum at one end of the frame unit on one side of said mandrel between said upper and lower frame sections and a belt-receiving drum at the other end of the drum unit on the other side of said mandrel between the upper and lower frame sections thereof, means for supporting said belt-driving drum for rotation about a generally vertical axis, and means for supporting said belt-receiving drum for rotation about a generally vertical axis, said last mentioned means comprising first and second adjustable means carried by the upper and lower frame sections and being independently adjustable separately to vary the distance between each ends of the belt-receiving drum and said mandrel which adjusts the angle of the drum axis with respect to the vertical.

26. In a machine for winding strips of flexible material around a horizontal mandrel by moving an endless belt helically wrapped around the strips applied over the mandrel, the improvement in means for supporting said belt comprising: an upstanding frame unit through which said mandrel extends, said unit having vertically spaced upper and lower frame sections, a belt-driving drum at one end of the frame unit on one side of said mandrel between said upper and lower frame sections and a belt-receiving drum at the other end of the frame unit on the other side of said mandrel between the upper and lower frame sections thereof, means for supporting said belt-driving drum for rotation about a generally vertical axis, said last mentioned means comprising first and second adjustable means respectively carried by the upper and lower frame sections, and being independently adjustable separately to vary the spacing of each of the belt-driving drum with respect to said mandrel which adjusts the angle of the drum axis with respect to the vertical, and means for supporting said belt-receiving drum for rotation about a generally vertical axis, said last mentioned means comprising third and fourth adjustable means carried by the upper and lower frame sections and being independently adjustable separately to vary the distance between each end of the belt-receiving drum and said mandrel which adjusts the angle of the drum axis with respect to the vertical.

27. In a machine for winding strips of flexible material around a horizontal mandrel by moving an endless belt helically wrapped around the strips applied over the mandrel, the improvement in means for supporting said belt comprising: an upstanding frame unit through which said mandrel extends and which is mounted for angular adjustment about a vertical axis intersecting the longitudinal axis of the mandrel, said frame unit having vertically spaced upper and lower frame sections, a belt-driving drum at one end of the frame unit on one side of said mandrel between said upper and lower frame sections and a belt-receiving drum at the other end of the frame unit on the other side of said mandrel between the upper and lower frame sections thereof, means for supporting said belt-driving drum for rotation about a generally vertical axis, said last mentioned means comprising first and second adjustable means respectively carried by the upper and lower frame sections and being independently adjustable to vary the spacing of the adjacent ends of the belt-driving drum with respect to said mandrel, and means on said frame unit for supporting said belt-receiving drum for rotation about a generally vertical axis, said last mentioned means comprising third and fourth adjustable means carried by the upper and lower frame sections and being independently adjustable separately to vary the distance between each end of the belt-receiving drum and said mandrel which adjusts the angle of the drum axis with respect to the vertical, and means for rotating the belt-driving drum for substantially all angular positions of the frame unit, said last mentioned means comprising rotatable drive means whose axis of rotation is coextensive with said axis of rotation of the unit, and rotary motion-transmitting means extending between said rotatable drive means and one end of the associated belt-driving drum.

28. In a machine for winding strips of flexible material around a horizontal mandrel by moving an endless belt helically wrapped around the strips applied over the mandrel, the improvement in means for supporting a pair of such drive belts in longitudinally spaced and driving relation along said mandrel comprising: first and second longitudinally spaced upstanding frame units through which said mandrel extends and which are mounted for angular adjustment about horizontally spaced vertical axes intersecting the longitudinal axis of the mandrel, each of the frame units having vertically spaced upper and lower frame sections, a belt-driving drum at one end of the frame unit on one side of said mandrel between said upper and lower frame sections and a belt-receiving drum at the other end of the frame unit on the other side of said mandrel between the upper and lower frame sections thereof, means for supporting said belt-driving drums for rotation about a generally vertical axis, means for supporting said belt-receiving drum for rotation about a generally vertical axis, a first pair of adjustable length tie rods respectively extending between the upper and lower sections of said pair of frame units on one side of said mandrel, a second pair of adjustable length tie rods respectively extending between the upper and lower frame sections of the frame units on the other side of said mandrel, said frame units and said tie rods extending generally along the perimeter of a parallelogram, and means for rotating the belt-driving drum of each frame unit for substantially all angular positions of the frame unit, said last mentioned means comprising first rotatable drive means whose axis of rotation is coextensive with said axis of rotation of the frame unit and rotary motion-transmitting means extending between said first rotatable drive means and one end of the associated belt-driving drum.

29. In a machine for winding strips of flexible material around a horizontal mandrel by moving an endless belt helically wrapped around the strips applied over the mandrel, the improvement in means for supporting a pair of such drive belts in longitudinally spaced and driving relation along said mandrel comprising: first and second longitudinally spaced upstanding frame units through which said mandrel extends and which are mounted for angular adjustment about horizontally spaced vertical axes intersecting the longitudinal axis of the mandrel, each of the frame units having vertically spaced upper and lower frame sections, a belt-driving drum at one end of the frame unit on one side of said mandrel between the upper and lower frame sections and a belt-receiving drum at the other end of the frame unit on the other side of said mandrel between the upper and lower frame sections thereof, means for supporting said belt-driving drums for rotation about a generally vertical axis, means for supporting said belt-receiving drums for rotation about a generally vertical axis, a first pair of adjustable length tie rods respectively extending between the upper and lower sections of said pair of frame units on one side of said mandrel, a second pair of adjustable length tie rods respectively extending between the upper and lower frame sections of the frame units on the other side of said mandrel, said frame units and said tie rods extending generally along the perimeter of a parallelogram, and means for simultaneously varying the angle of said frame units with respect to said mandrel.

30. In a machine for winding strips of flexible material around a horizontal mandrel by moving an endless belt helically wrapped around the strips applied over the mandrel, the improvement in means for supporting a pair of such drive belts in longitudinally spaced and driving relation along said mandrel comprising: first and second longitudinally spaced upstanding frame units through which said mandrel extends mounted for angular adjustment about horizontally spaced vertical axes intersecting the longitudinal axis of the mandrel, each of the frame units having vertically spaced upper and lower frame sections, a belt-driving drum at one end of the frame unit on one side of said mandrel between said upper and lower frame sections and a belt-receiving drum at the other end of the frame on the other side of said mandrel between the upper and lower frame sections thereof, means for supporting said belt-driving drums for rotation about a generally vertical axis, means for supporting said belt-receiving drums for rotation about a generally vertical axis, a first pair of adjustable length tie rods respectively extending between the upper and lower sections of said pair of frame units on one side of said mandrel, a second pair of adjustable length tie rods respectively extending between the upper and lower frame sections of the frame units on the other side of said mandrel, said frame units and said tie rods extending generally along the perimeter of a parallelogram, means for simultaneously varying the angle of said frame units with respect to said mandrel comprising a manually rotatable screw, and means connecting one of said frame units to the screw including a nut surrounding the screw and a coupling permitting pivotal and linear movement between the nut and the frame units and means for rotating the belt-driving drum of each frame unit for substantially all angular positions of the frame unit, said last mentioned means comprising first rotatable drive means whose axis of rotation is coextensive with said axis of rotation of the frame unit, and rotary motion-transmitting means extending between said first rotatable drive means and one end of the associated belt-driving drum.

31. In a machine for winding strips of flexible material around a horizontal mandrel by moving an endless belt helically wrapped around the strips applied over the mandrel, the improvement in means for supporting a pair of such drive belts in longitudinally spaced and driving relation along said mandrel comprising: first and second longitudinally spaced upstanding frame units through which said mandrel extends and which are for angular adjustment about horizontally spaced vertical axes intersecting the longitudinal axis of the mandrel, each of the frame units having vertically spaced upper and lower frame sections, a belt-driving drum at one end of the frame unit on one side of said mandrel between said upper and lower frame sections and a belt-receiving drum at the other end of the frame on the other side of said mandrel between the upper and lower frame sections thereof, means for supporting said belt-driving drums for rotation about a generally vertical, said last mentioned means comprising first and second adjustable means respectively carried by the upper and lower frame sections, and being independently adjustable separately to vary the spacing of each end of the belt-driving drum with respect to said mandrel which adjusts the angle of the drum axis with respect to the vertical, said last mentioned means comprising third and fourth adjustable means carried by the associated respectively upper and lower frame sections and being independly adjustable separately to vary the distance between each end of the belt-receiving drum and said mandrel, means for simultaneously varying the angle of said frame units with respect to said mandrel, and means for rotating the belt-driving drum of each frame unit for substantially all angular positions of the frame unit, said last mentioned means comprising first rotatable drive means whose axis of rotation is coextensive with said axis of rotation of the frame unit and rotary motion-transmitting means extending between said first rotatable drive means and one end of the associated belt-driving drum.

References Cited in the file of this patent

UNITED STATES PATENTS

| | | |
|---|---|---|
| 507,764 | Spengler | Oct. 31, 1893 |
| 593,896 | Johnson | Nov. 16, 1897 |
| 867,298 | Perry | Oct. 1, 1907 |
| 1,160,100 | Reynders | Nov. 9, 1915 |
| 1,164,878 | Selfridge | Dec. 21, 1915 |
| 1,258,731 | Yingling | Mar. 12, 1918 |
| 1,782,618 | Jauch | Nov. 25, 1930 |
| 1,915,253 | Prifold | June 20, 1933 |
| 1,938,095 | Conti | Dec. 5, 1933 |
| 2,046,139 | Votteler | June 30, 1936 |
| 2,128,564 | Schoen et al. | Aug. 30, 1938 |
| 2,221,441 | Charters | Nov. 12, 1940 |
| 2,256,263 | Haycock | Sept. 16, 1941 |
| 2,501,938 | Heyman | Mar. 28, 1950 |
| 2,508,798 | Polsen et al. | May 23, 1950 |
| 2,558,849 | Hodge | July 3, 1951 |
| 2,672,119 | Ertner | Mar. 16, 1954 |
| 2,755,028 | Noall | July 17, 1956 |
| 2,918,896 | Uhleen | Dec. 29, 1959 |

FOREIGN PATENTS

| | | |
|---|---|---|
| 691,552 | Great Britain | May 13, 1953 |